United States Patent
Tin

(10) Patent No.: US 8,311,324 B2
(45) Date of Patent: Nov. 13, 2012

(54) PERFORMING SPECTRAL GAMUT MAPPING FOR REPRODUCING AN IMAGE

(75) Inventor: Siu-Kei Tin, Milpitas, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 617 days.

(21) Appl. No.: 12/538,829

(22) Filed: Aug. 10, 2009

(65) Prior Publication Data

US 2011/0033108 A1 Feb. 10, 2011

(51) Int. Cl.
*G06K 9/00* (2006.01)
*G09G 5/00* (2006.01)
*G06K 9/34* (2006.01)

(52) U.S. Cl. ........................ 382/167; 345/590

(58) Field of Classification Search .................. 382/162, 382/164, 165, 167, 274; 345/589, 590, 600–604, 345/610; 358/1.2, 1.9, 2.1, 501, 518, 531, 358/535; 348/222.1, 655
See application file for complete search history.

(56) References Cited

U.S. PATENT DOCUMENTS

| | | | |
|---|---|---|---|
| 5,583,666 A | 12/1996 | Ellson et al. | |
| 5,892,891 A | 4/1999 | Dalal et al. | |
| 6,698,860 B2 | 3/2004 | Berns et al. | |
| 6,744,534 B1 | 6/2004 | Balasubramanian et al. | |
| 8,019,154 B2 * | 9/2011 | Tin ................................ | 382/167 |
| 8,068,255 B2 * | 11/2011 | Stokes ........................... | 358/1.9 |
| 8,098,400 B2 * | 1/2012 | Tin ................................. | 358/1.9 |
| 2003/0098896 A1 | 5/2003 | Berns et al. | |
| 2005/0094871 A1 | 5/2005 | Berns et al. | |
| 2005/0111017 A1 | 5/2005 | Takahashi et al. | |
| 2006/0110031 A1 | 5/2006 | Bala et al. | |
| 2007/0121132 A1 * | 5/2007 | Blinn et al. .................... | 358/1.9 |
| 2007/0293132 A1 | 12/2007 | Kaneko et al. | |
| 2008/0117444 A1 | 5/2008 | Stokes | |

(Continued)

FOREIGN PATENT DOCUMENTS

WO 2005-043884 5/2005

OTHER PUBLICATIONS

F. Nakaya, et al., "Spectral encoding/decoding using LabRGB", Society for Imaging Science and Technology, 2007, pp. 190-194.

(Continued)

*Primary Examiner* — Amir Alavi
(74) *Attorney, Agent, or Firm* — Fitzpatrick, Cella, Harper & Scinto

(57) ABSTRACT

Spectral gamut mapping is performed for reproducing an image comprising a plurality of pixels using a device. Sample data is generated to span a spectral gamut of the device, the sample data is divided into plural subdivisions based on colorimetry of the sample data, a local interim connection space (ICS) is constructed for each of the plural subdivisions, and a sub-gamut is constructed corresponding to each of the local ICS's. For each of the plurality of pixels, a sub-gamut which corresponds to the pixel is selected from the constructed sub-gamuts, and spectral gamut mapping is performed for the pixel using the selected sub-gamut in the local ICS.

20 Claims, 26 Drawing Sheets

U.S. PATENT DOCUMENTS

| | | |
|---|---|---|
| 2008/0137941 A1 | 6/2008 | Tin |
| 2008/0239417 A1 | 10/2008 | Tsutsumi |
| 2008/0246982 A1 | 10/2008 | Kaneko et al. |
| 2009/0141321 A1 | 6/2009 | Tin |
| 2009/0141322 A1 | 6/2009 | Tin |
| 2009/0141970 A1 | 6/2009 | Tin |
| 2009/0148040 A1 | 6/2009 | Tin |
| 2009/0185200 A1 | 7/2009 | Tin |
| 2009/0201309 A1* | 8/2009 | Demos .......................... 345/589 |
| 2009/0310154 A1* | 12/2009 | Morovic et al. ................ 358/1.9 |
| 2011/0033108 A1* | 2/2011 | Tin ................................ 382/167 |
| 2011/0182504 A1* | 7/2011 | Sloan et al. ................... 382/162 |

OTHER PUBLICATIONS

M. Derhak, et al., "Spectral Colorimetry Using LabPQR—An Interim Connection Space", IS&T/SID Twelfth Color Imaging Conference, pp. 246-250, 2006.

U.S. Appl. No. 12/435,397, filed May 5, 2009, Applicant: Siu-Kei Tin.

U.S. Appl. No. 12/260,916, filed Oct. 29, 2008, Applicant: Siu-Kei Tin.

U.S. Appl. No. 12/435,402, filed May 4, 2009, Applicant: Siu-Kei Tin.

* cited by examiner

◇ 0-dimensional stratum ($n_0 = 1$)

○ 1-dimensional strata ($n_1 = 20$)

□ 2-dimensional stratum ($n_2 = 4$)

PERFORMING SPECTRAL GAMUT MAPPING FOR REPRODUCING AN IMAGE

FIELD

The invention relates to the field of color management, and more particularly relates to performing spectral gamut mapping for reproducing an image.

BACKGROUND

In spectral color reproduction, there is typically a mismatch between the spectral gamut of the source device and that of the destination device. The adjustment for this gamut mismatch is referred to as spectral gamut mapping.

In this regard, it is typically noted that 31 dimensions are sufficient to represent the spectral reflectance of a physical stimuli, which gives rise to a particular color sensation under a given illuminant and viewing condition. The 31 dimensions correspond to the visible wavelengths from 400 nm to 700 nm, at every 10 nm interval.

However, spectral gamut mapping using 31 dimensions may be too demanding for some computing hardware, such as general purpose computers or specialized ASIC devices. As such, an interim connection space (ICS) may be used for spectral gamut mapping. An ICS is an intermediate space which can be used to reduce the number of dimensions associated with spectral gamut mapping. In principle, an ICS has any dimension lower than 31. Typically, an ICS has a dimension ranging from 5 to 8.

In designing an ICS, the ICS should be accurate enough such that its relatively low dimension can still carry the information needed for spectral color imaging. In other words, the ICS should work for many illuminants, not just one or two. On the other hand, since many operations are typically associated with spectral gamut mapping (e.g., convex hulling), and these operations involve or generate results of complexity that may depend exponentially on the dimension, there is a desire to keep the dimension as low as possible.

Thus, there is a need for improved efficiency in spectral gamut mapping using an ICS, so that accuracy is maintain and the number of dimensions is reduced.

SUMMARY

Disclosed embodiments describe systems and methods for performing spectral gamut mapping for reproducing an image comprising a plurality of pixels using a device. Sample data is generated to span a spectral gamut of the device, and the sample data is divided into plural subdivisions based on colorimetry of the sample data. A local interim connection space (ICS) is constructed for each of the plural subdivisions, and a sub-gamut corresponding to each of the local ICS's is constructed. For each of the plurality of pixels, a sub-gamut which corresponds to the pixel is selected from the constructed sub-gamuts, and spectral gamut mapping is performed for the pixel using the selected sub-gamut in the local ICS.

Thus, in an example embodiment described herein, a method for performing spectral gamut mapping for reproducing an image comprising a plurality of pixels using a device is provided. The method includes the steps of generating sample data to span a spectral gamut of the device, dividing the sample data into plural subdivisions based on colorimetry of the sample data, constructing a local ICS for each of the plural subdivisions, and constructing a sub-gamut corresponding to each of the local ICS's. The method further includes the steps of, for each of the plurality of pixels, selecting a sub-gamut, from the constructed sub-gamuts, which corresponds to the pixel, and performing spectral gamut mapping for the pixel using the selected sub-gamut in the local ICS.

In a further example embodiment, a color management module which performs spectral gamut mapping for reproducing an image comprising a plurality of pixels using a device is provided. The color management module includes a generating module constructed to generate sample data to span a spectral gamut of the device, a dividing module constructed to divide the sample data into plural subdivisions based on colorimetry of the sample data, a first constructing module constructed to construct a local ICS for each of the plural subdivisions, and a second constructing module constructed to construct a sub-gamut corresponding to each of the local ICS's. The color management module further includes a selecting module constructed to select, for each of the plurality of pixels, a sub-gamut, from the constructed sub-gamuts, which corresponds to the pixel. In addition, the color management module includes a spectral gamut mapping module constructed to perform, for each of the plurality of pixels, spectral gamut mapping for the pixel using the selected sub-gamut in the local ICS.

In yet a further example embodiment, a color management apparatus is provided and includes a computer-readable memory constructed to store computer-executable process steps, and a processor constructed to execute the computer-executable process steps stored in the memory. The process steps stored in the memory cause the processor to perform spectral gamut mapping for reproducing an image comprising a plurality of pixels using a device, and include computer-executable process steps to generate sample data to span a spectral gamut of the device, divide the sample data into plural subdivisions based on colorimetry of the sample data, construct a local ICS for each of the plural subdivisions, and construct a sub-gamut corresponding to each of the local ICS's. The process steps further include computer-executable process steps to, for each of the plurality of pixels, select a sub-gamut, from the constructed sub-gamuts, which corresponds to the pixel, and perform spectral gamut mapping for the pixel using the selected sub-gamut in the local ICS.

In yet a further example embodiment, a computer-readable memory medium on which is stored computer-executable process steps for causing a computer to perform spectral gamut mapping for reproducing an image comprising a plurality of pixels using a device is provided. The process steps include generating sample data to span a spectral gamut of the device, dividing the sample data into plural subdivisions based on colorimetry of the sample data, constructing a local ICS for each of the plural subdivisions, and constructing a sub-gamut corresponding to each of the local ICS's. The process steps further include, for each of the plurality of pixels, selecting a sub-gamut, from the constructed sub-gamuts, which corresponds to the pixel, and performing spectral gamut mapping for the pixel using the selected sub-gamut in the local ICS.

The generating, dividing, constructing the local ICS and constructing the sub-gamut can be performed during an offline phase, after device characterization data is collected for the device. The selecting and performing can be performed during an online phase, when the image has been received.

The generated sample data can correspond with a stratified sampling of a device space of the device, and the stratified sampling can be associated with sampling of the device space at different sampling rates, depending on a dimension of the stratum. The generating the sample data can include generating sample device values for the device, and determining spectral reflectance arrays corresponding to the sample device values using a forward device model for the device.

The sample data can include a set of samples, with each sample within the set corresponding to at least one of the plural subdivisions. The dividing the sample data can include converting the sample data to XYZ values under a reference illuminant, converting the XYZ values to LCh values based on a media white point of the device, and dividing the sample data into plural subdivisions based on the LCh values.

The dividing the sample data into plural subdivisions can be based on a neutral spine and a collection of hue leaves for the sample data. The constructing the local ICS can include, for each of the plural subdivisions, determining whether the subdivision is part of the neutral spine, determining neighboring subdivisions in the neutral spine, in a case where it is determined that the subdivision is part of the neutral spine, determining neighboring subdivisions in a hue leaf, in a case where it is determined that the subdivision is not part of the neutral spine, and constructing the local ICS for the subdivision based on samples in the determined neighboring subdivisions.

The selecting the sub-gamut, from the constructed sub-gamuts, which corresponds to the pixel can include converting a spectral reflectance which corresponds to the pixel to a colorimetric value, performing colorimetric gamut mapping on the colorimetric value, converting the colorimetric gamut-mapped value to an LCh value based on a media white point of the device, and selecting the sub-gamut based on the LCh value.

This brief summary has been provided so that the nature of this disclosure may be understood quickly. A more complete understanding can be obtained by reference to the following detailed description and to the attached drawings.

DETAILED DESCRIPTION

Figure 1:
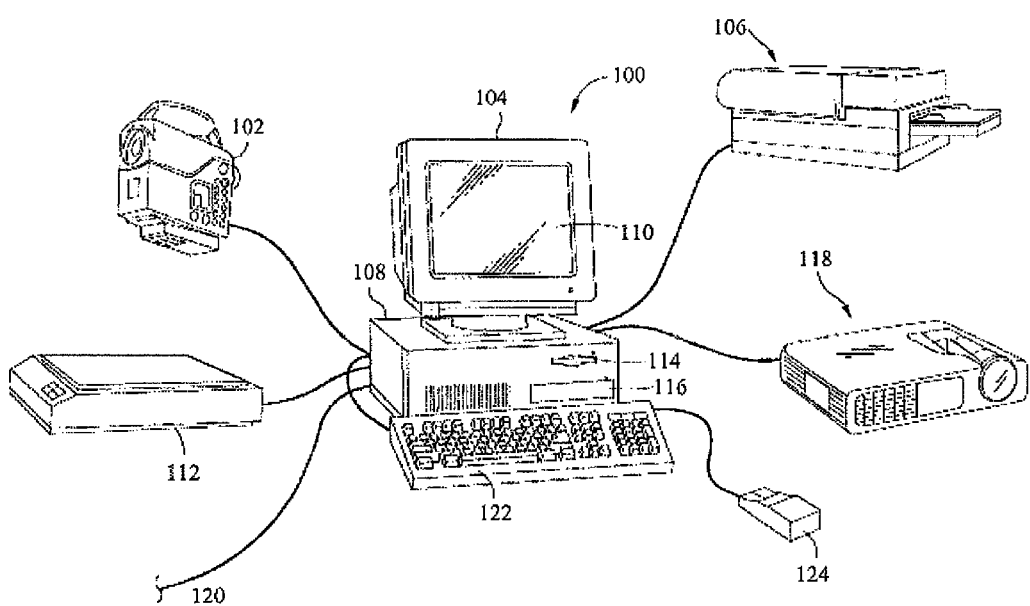
FIG. 1 is a representative view of computing equipment relevant to an example embodiment.

FIG. 1 is a representative view of computing equipment, peripherals and digital devices, relevant to an example embodiment. Computing equipment 100 includes host computer 108 which generally comprises a programmable general purpose personal computer (hereinafter "PC") having an operating system such as Microsoft® Windows® or Apple® Mac OS® or LINUX, and which is programmed as described below so as to perform particular functions and in effect to become a special purpose computer when performing these functions. Computing equipment 100 includes color monitor 104 including display screen 110, keyboard 122 for entering text data and user commands, and pointing device 124. Pointing device 124 preferably comprises a mouse for pointing and for manipulating objects displayed on display screen 110.

Host computer 108 also includes computer-readable memory media such as computer hard disk 116 and DVD disc drive 114, which are constructed to store computer-readable information such as computer-executable process steps. DVD disc drive 114 provides a means whereby host computer 108 can access information, such as image data, computer-executable process steps, application programs, etc. stored on removable memory media. In an alternative, information can also be retrieved through other computer-readable media such as a USB storage device connected to a USB port (not shown), or through network interface 120. Other devices for accessing information stored on removable or remote media may also be provided.

Projector 118 is a first example of a color output device, and in this example is provided for projecting images in accordance with image data from host computer 108 onto a projection screen (not shown). Printer 106 is a second example of a color output device, and in this example is provided for forming color images in accordance with image data from host computer 108 onto a medium such as paper.

Digital color scanner 112 is a first example of a color input device, and is provided for scanning documents and images and sending the corresponding image data to host computer 108. Digital color camera 102 is a second example of a color input device, and is provided for sending digital image data to host computer 108.

Of course, host computer 108 may acquire digital image data from other sources such as a digital video camera, a local area network or the Internet via network interface 120. Likewise, host computer 108 may interface with other color output devices, such as color output devices accessible over network interface 120.

Figure 2:
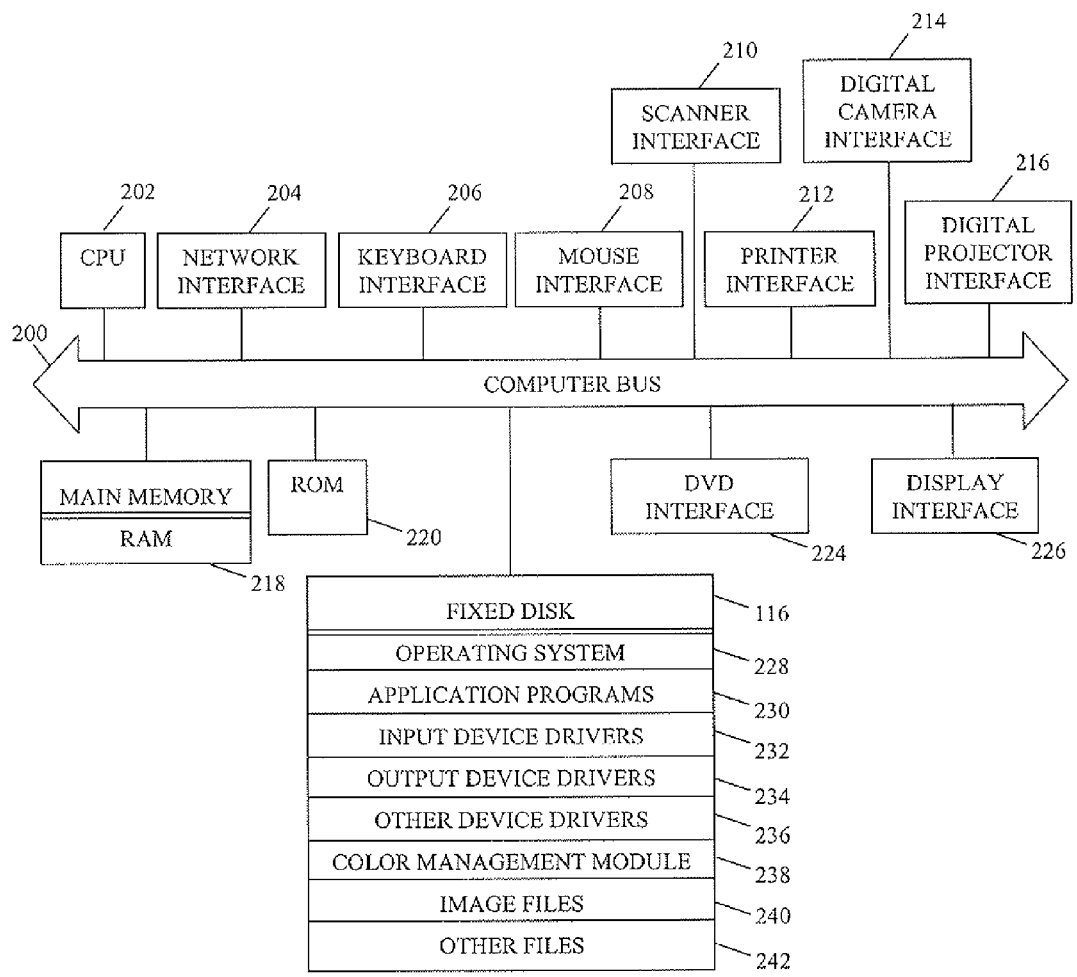
FIG. 2 is a detailed block diagram depicting the internal architecture of the host computer shown in FIG. 1.

FIG. 2 is a detailed block diagram showing the internal architecture of host computer 108 of computing equipment 100. As shown in FIG. 2, host computer 108 includes central processing unit (CPU) 212 which interfaces with computer bus 200. Also interfacing with computer bus 200 are hard disk 116, network interface 204, random access memory (RAM) 218 for use as a main run-time transient memory, read only memory (ROM) 220, DVD disc interface 224, display interface 226 for monitor 104, keyboard interface 206 for keyboard 122, mouse interface 208 for pointing device 124, scanner interface 210 for scanner 112, printer interface 212 for printer 106, digital camera interface 214 for digital camera 102, and digital projector interface 216 for digital projector 118.

RAM 218 interfaces with computer bus 200 so as to provide information stored in RAM 218 to CPU 202 during execution of the instructions in software programs such as an operating system, application programs, color management modules, and device drivers. More specifically, CPU 202 first loads computer-executable process steps from fixed disk 116, or another storage device into a region of RAM 218. CPU 202 can then execute the stored process steps from RAM 218 in order to execute the loaded computer-executable process steps. Data such as color images or other information can be stored in RAM 218, so that the data can be accessed by CPU 202 during the execution of computer-executable software programs, to the extent that such software programs have a need to access and/or modify the data.

As also shown in FIG. 2, hard disk 116 contains operating system 228, application programs 230, such as word processing programs or a graphic image management programs. Hard disk 116 also contains device drivers for software interface to devices, such as input device drivers 232, output device drivers 234, and other device drivers 236. Image files 240, including color image files, and other files 242 are available for output to color output devices and for manipulation by application programs.

Color management module (CMM) 238 manages colors that are transferred from a source device to a destination device, such as the transfer of color image data from capture by digital camera 102 to a printout by printer 106. CMM 238 can comprise computer-executable process steps to convert digital values corresponding to colors of an image from the source device to the destination device. In doing so, CMM 238 can perform spectral gamut mapping for reproducing an image. For example, in a separate stage typically occurring in a device profiling process such as in a device manufacturer's facility, a special purpose program, typically referred to as device profiling software, can perform the following: generate sample data to span a spectral gamut of the device, divide the sample data into plural subdivisions based on colorimetry of the sample data, construct a local ICS for each of the plural subdivisions, construct a sub-gamut corresponding to each of the local ICS's, and save the results to a file. The file, in turn, can be shipped to a user. When the user chooses to print an image, CMM 238 can read the constructed local ICS's and sub-gamuts from the file. For each of the plurality of pixels of the image, CMM 238 can select a sub-gamut, from the constructed sub-gamuts, which corresponds to the pixel, and perform spectral gamut mapping for the pixel using the selected sub-gamut in the local ICS.

CMM 238 may be configured as a part of operating system 228, as part of a device driver (e.g., printer driver, digital camera driver), or as a stand-alone application program such as a color management system. It may also be configured as a plug-in or dynamic link library (DLL) to the operating system, device driver or application program. For example, CMM 238 according to example embodiments may be incorporated in an input/output device driver for execution in a computing device, embedded in the firmware of an input/output device, or provided in a stand-alone color management application for use on a general purpose computer. In one example embodiment described herein, CMM 238 is incorporated directly into the operating system for general purpose host computer 108. It can be appreciated that the present disclosure is not limited to these embodiments and that the disclosed color management module may be used in other environments in which color management is used.

Figure 3:
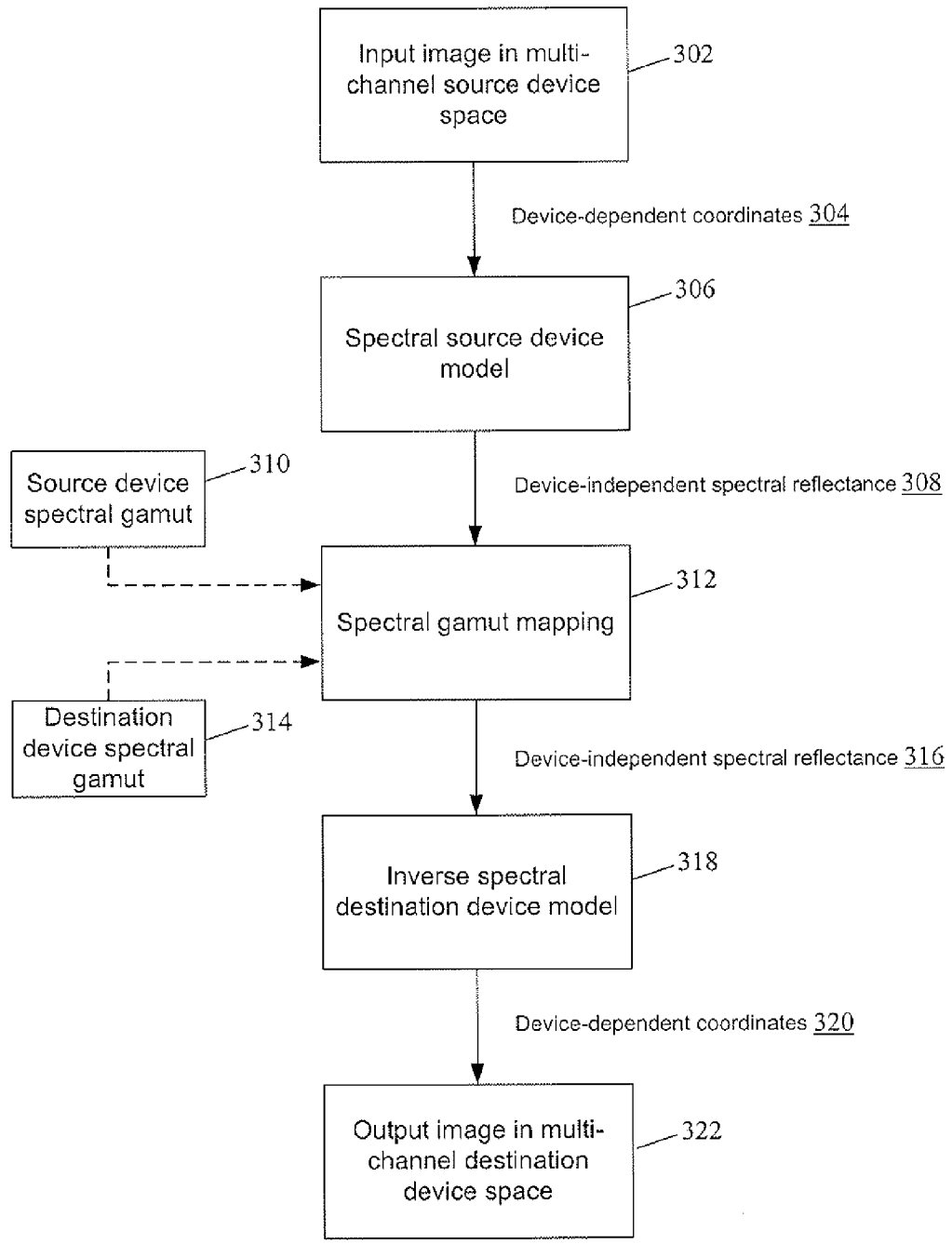
FIG. 3 is a diagram illustrating an example of performing spectral gamut mapping.

FIG. 3 is a diagram illustrating an example of a general arrangement of steps for performing spectral gamut mapping. As noted above, there is typically a mismatch between the spectral gamuts of source and destination devices.

As can be seen in FIG. 3, an input image 302 in multi-channel source device space in the form of device-dependent coordinates 304 can be input into a spectral source device model 306. Output from the spectral source device model 306 in the form of device-independent spectral reflectance data 308, together with a source device spectral gamut 310, determined separately, and a destination device spectral gamut 314, determined separately, can be input into spectral gamut mapping module 312. The spectral gamut mapping module 312 may optionally utilize only the destination device spectral gamut 314 and ignore the source device spectral gamut 310. Output from spectral gamut mapping module 312 in the form of device-independent spectral reflectance data 316 can be provided to inverse spectral destination device model 318. Inverse spectral destination device model 318 can output device-dependent coordinates 320, corresponding to an output image in multi-channel destination device space 314.

It should be noted that the source device referred to in FIG. 3 can be a device in the traditional sense (e.g., digital camera 102 or digital color scanner 112). Alternatively, the source device can be a set of colors, such as from a reflective target (e.g., a Digital ColorChecker SG).

In general, the goal in spectral color management is color reproduction that achieves a spectral match. In other words, the spectral reflectance of the reproduction is the same as the original. This enables a color match under arbitrary light sources.

In this regard, spectral reflectance typically refers to destination devices that are reflective. For example, such devices include printers with multiple inks, and devices including reflective displays (e.g., e-paper).

As noted above, spectral gamut mapping which uses 31 dimensions may be too demanding for some computing hardware, such as general purpose computers or specialized ASIC devices. As such, an interim connection space (ICS) may be used to reduce the number of dimensions associated with spectral gamut mapping. Typically, an ICS has a dimension ranging from 5 to 8.

Figure 4:
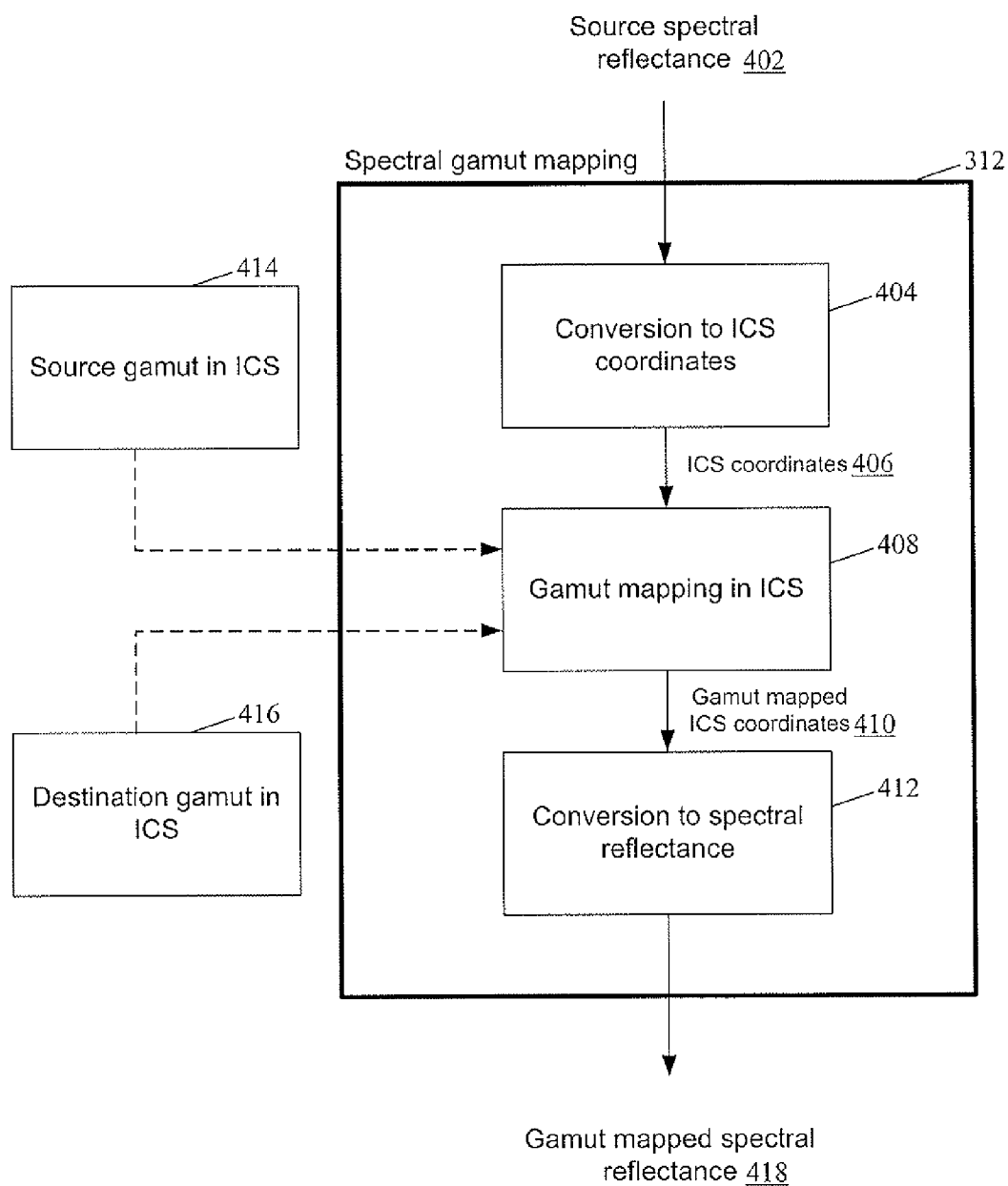
FIG. 4 is a diagram illustrating an example of using an interim connection space (ICS) for performing spectral gamut mapping.

FIG. 4 is a diagram illustrating an example of using an interim connection space (ICS) for performing spectral gamut mapping. Furthermore, FIG. 4 illustrates an example of the processing which can occur in spectral gamut mapping module 312 of FIG. 3.

When an ICS is used, the spectral gamut mapping can be thought of conceptually as occurring in the ICS. As can be seen in FIG. 4, spectral gamut mapping module 312 can include a module 404, which receives source spectral reflectance data 402 as input and which outputs ICS coordinates 406. Spectral gamut mapping module 312 can further include a module 408 for gamut mapping in the ICS utilizing gamuts constructed in the ICS. Module 408 receives ICS coordinates 406, together with a source gamut 414 in the ICS and a destination gamut 416 in the ICS, and outputs gamut mapped ICS coordinates 410. For example, source gamut 414 and destination gamut 416 can be manifestations of gamuts 310 and 314 in the case of using ICS. In addition, spectral gamut mapping module 312 can include a module 412 for converting ICS coordinates to spectral reflectance. More particularly, module 412 receives gamut mapped ICS coordinates 410 as input and outputs gamut mapped spectral reflectance data 418. It should be noted that the ICS is typically dependent only on the destination device, since the ICS is typically designed to contain the gamut of the destination device.

In using the approach for spectral gamut mapping as illustrated in FIG. 4, the design of the ICS can be critical. As noted above, the ICS should be accurate enough such that its relatively low dimension can still carry the information needed for spectral color imaging. In other words, the ICS should work for many illuminants, not just one or two. On the other hand, since many operations are typically associated with spectral gamut mapping (e.g., convex hulling), and these operations typically involve or generate results of complexity that may depend exponentially on the dimension, there is a desire to keep the dimension as low as possible.

In general, the problem with spectral gamut mapping is computational efficiency and feasibility. Further, the computational complexity of spectral gamut mapping algorithms typically depends exponentially on the dimension. The dimension can be 31, if the space of spectral reflectance is used, or can be the dimension of an ICS, if an ICS is used. As noted above, the dimension of an ICS is typically a small number from 5 to 8, but this dimension can still be considered high in gamut mapping calculations, relative to the 3 dimensions used in conventional color management.

While the use of a relatively low dimensional ICS can theoretically solve the problem of computational complexity, is it not without issues. For example, introduction of an ICS typically causes a loss in precision. More particularly, an ICS is designed to remove dimensions which are considered insignificant. However, certain dimensions can be insignificant under certain illuminants but more significant under other illuminants. Such an ICS may result in a reproduction which is not a good match for original image data under certain illuminants. If this problem is simply addressed by including the removed insignificant dimensions, the problem of computational complexity increasing exponentially with dimension reappears. Thus, there is a need for improved efficiency in spectral gamut mapping using an ICS, so that accuracy is maintained and the number of dimensions is reduced.

Figure 5:
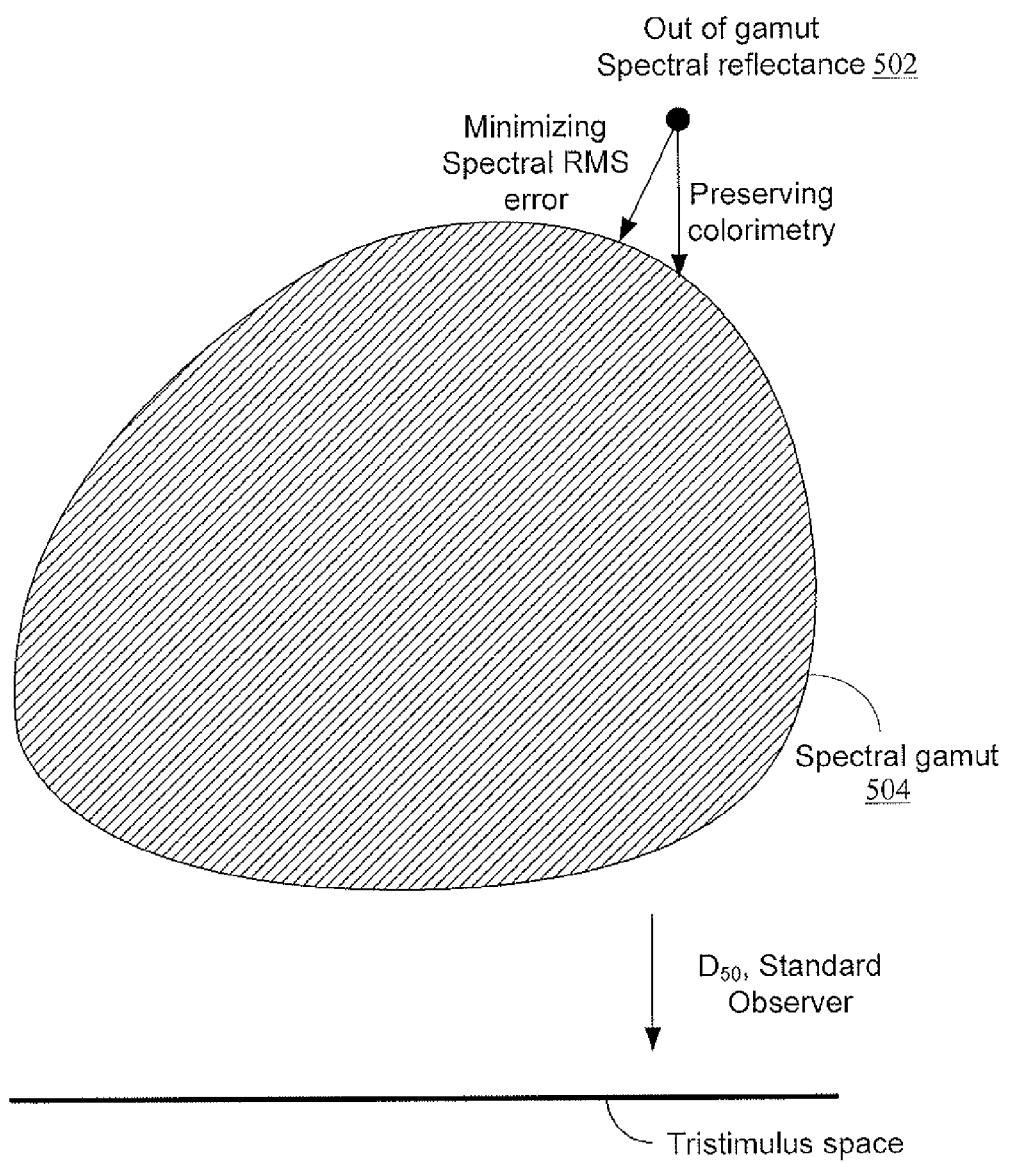
FIG. 5 is a representative view of a spectral gamut according to an example embodiment.

FIG. 5 is a representative view of a spectral gamut according to an example embodiment. To map an out-of-gamut spectral reflectance 502 onto spectral gamut 504, a minimizing spectral root-mean-square (RMS) error approach may be used. In one example approach, the spectral RMS error can be proportional to the Euclidean distance in the spectral reflectance space. Using example approach, it should be noted that the spectral RMS error does not necessarily correlate to visual error. In other words, small spectral RMS error may correspond to a large delta-E, which is typically the accepted measure for perceived error of human visual system. In another more sophisticated example approach, the spectral RMS errors can be minimized while attempting to preserve the colorimetry under a certain reference illuminant, e.g. $D_{50}$. Using this approach, minimization can be seen to be constrained along fixed colorimetry.

Building on the idea of spectral gamut mapping constrained to fixed colorimetry, it is possible to subdivide sample data by classifying them according to their colorimetry. Instead of constructing one ICS for all the sample data, a local ICS can be constructed for each subset of data, and sub-gamut of the spectral gamut can be constructed in each local ICS, as shown in FIG. 6.

Figure 6:
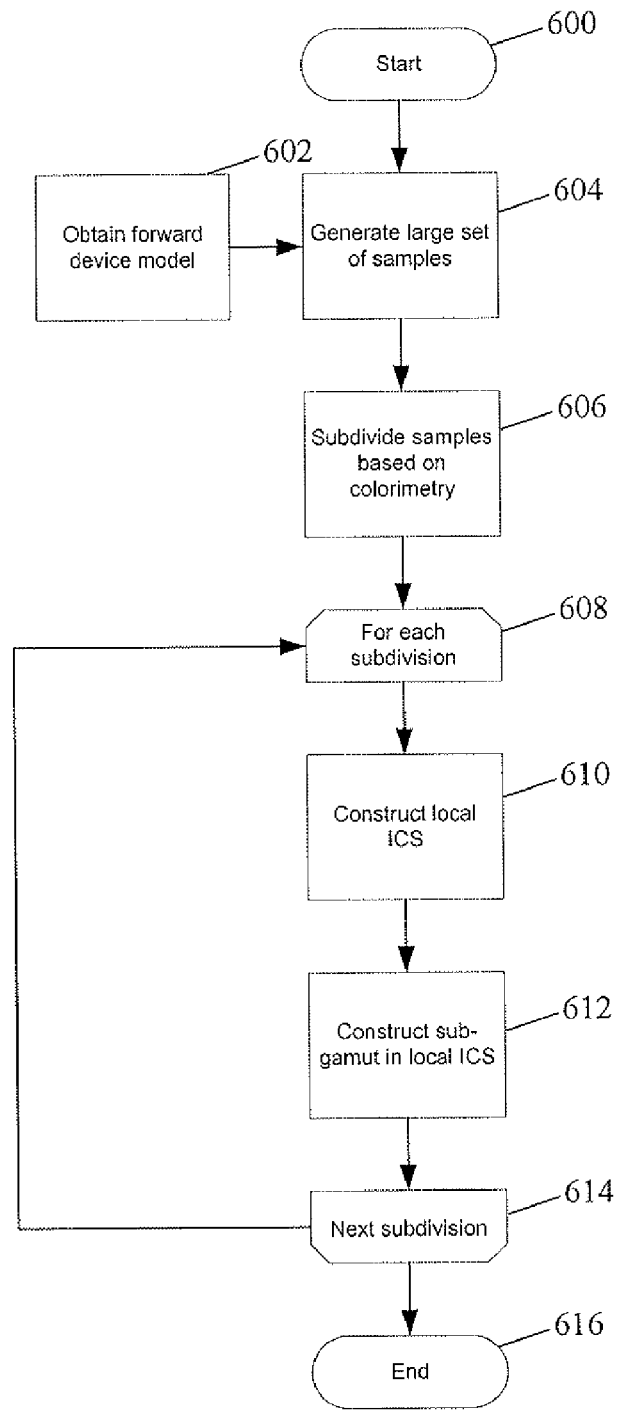
FIG. 6 is a flow diagram illustrating the construction of local ICS's and corresponding sub-gamuts for use in spectral gamut mapping, according to an example embodiment.

FIG. 6 is a flow diagram illustrating the construction of local ICS's and corresponding sub-gamuts for use in spectral gamut mapping, according to an example embodiment. Following start block 600, sample data sufficient to cover the spectral gamut is generated (block 604), based on an obtained forward device model (block 602). The sample data is subdivided into subsets based on their colorimetry (block 606). As depicted in the loop defined by blocks 608 and 614, for each subdivision, a local ICS is constructed (block 610), and a sub-gamut is constructed in each local ICS (block 612). The process then ends (end block 616).

Figure 7:
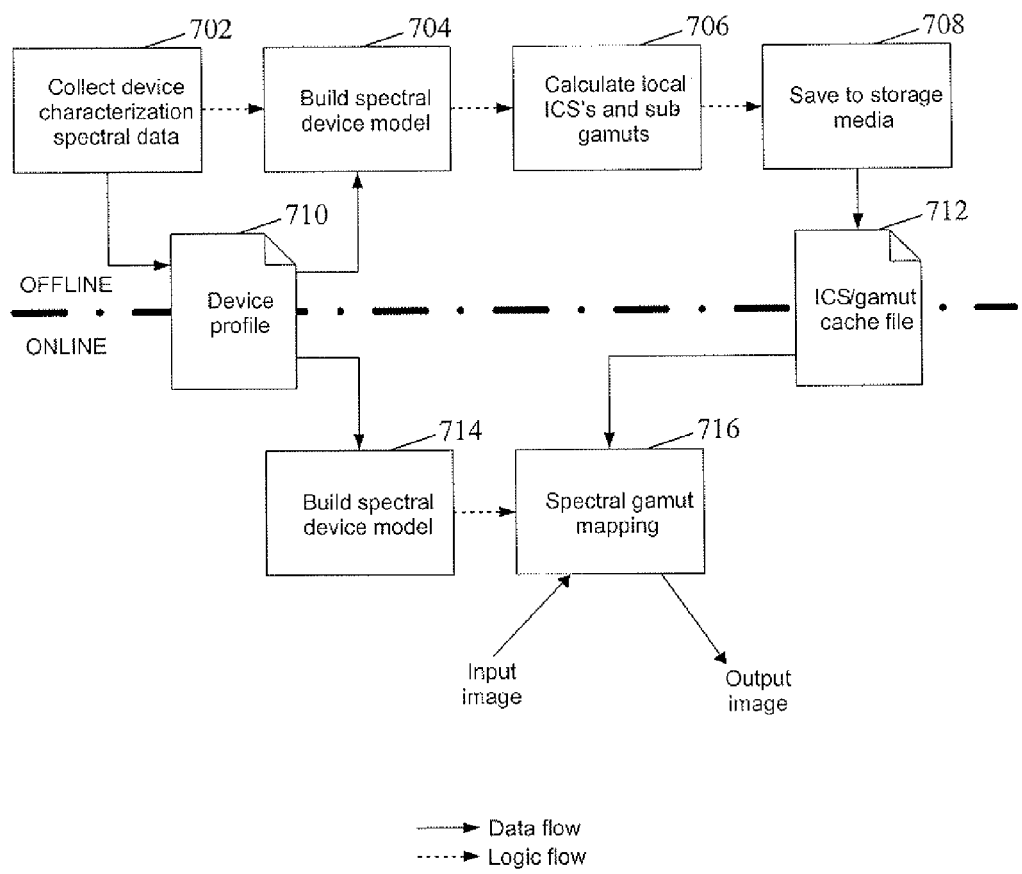
FIG. 7 is a representative view of an offline phase and an online phase for performing spectral gamut mapping according to an example embodiment.

FIG. 7 is a representative view of an offline phase and an online phase for performing spectral gamut mapping according to an example embodiment. In an offline phase, typically occurring in a device profiling process such as in a device manufacturer's facility, device characterization spectral data can be collected (block 702) and used to create a device profile 710. A spectral device model can be built (block 704) based on device profile 710. In addition, local ICS's and sub-gamuts can be constructed (block 706) as described in FIG. 6, and saved to storage media (block 708), for example, in an ICS/gamut cache file 712.

In an online phase, at each time an input image is received, a spectral device model can be built (block 714) based on the device profile 710. Further, spectral gamut mapping can be performed (716) using the built spectral device model and ICS/gamut cached file 712, to produce an output image.

Figure 8:
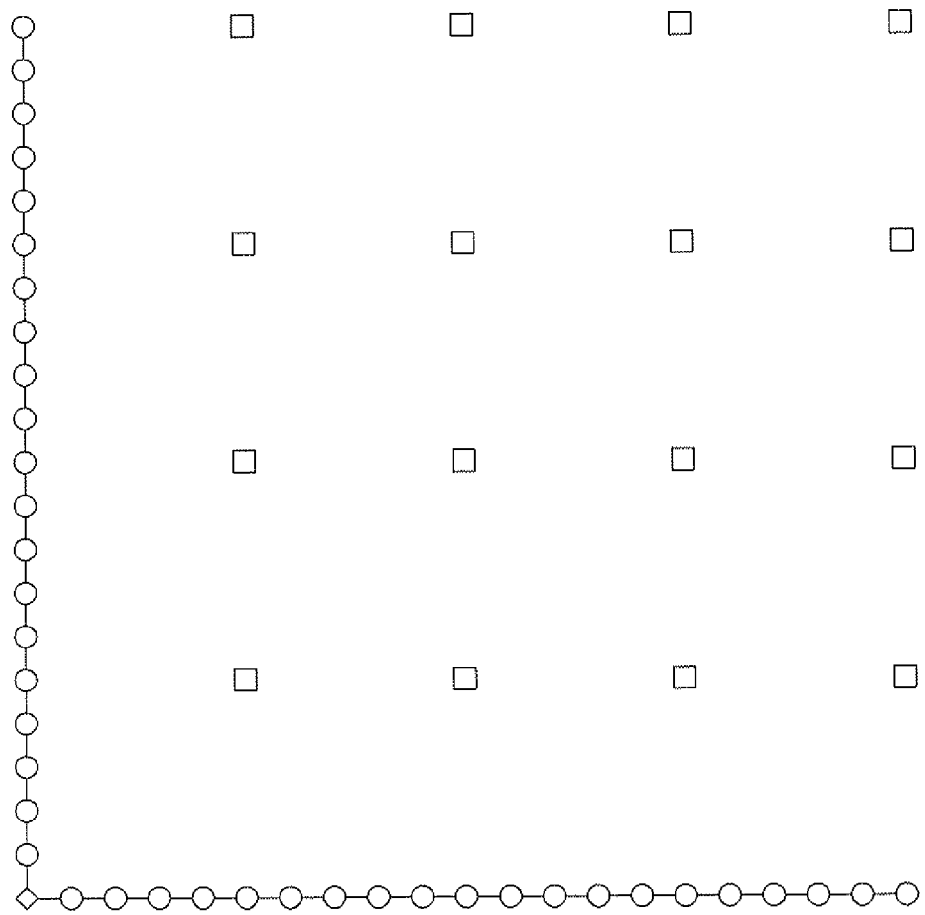
FIG. 8 is a representative view of using stratified sampling of a device space for use in constructing local ICS's, according to an example embodiment.

FIG. 8 is a representative view of using stratified sampling of a device space for use in constructing local ICS's, according to an example embodiment. As noted above with reference to FIG. 6, a large set of samples should initially be generated. FIG. 8 illustrates an example for generating this large set of samples. Of course, it should be noted that other manners for generating the large set of samples can be used.

In general, as many sample points as are computationally feasible to describe the gamut can be used. For a 6-ink printer and 256 levels per channel, the total number of ink combinations is $256^6 = 2^{48}$. Unfortunately, this number of samples can be infeasible or impractical for computers in terms of speed and storage. Further, the number of ink combinations grows exponentially with the number of inks. Thus, an algorithm other than exhaustive enumeration, whose complexity is of polynomial growth in the number of inks, can be used.

In this regard, it can be assumed that the primary part of the spectral gamut is spanned by 3-or-less-ink combinations. Thus, if there are N inks, and n+1 steps are sampled in each ink channel, then the total number of 3-or-less-ink combinations can be calculated as follows:

$$\binom{N}{3} \cdot n^3 + \binom{N}{2} \cdot n^2 + N \cdot n + 1 \qquad \text{(Equation 1)}$$

For example, if there are 6 inks (N=6), and n=51 (i.e., steps of 5 digital counts, or about 2%), then the total number is 2,692,342.

With reference to FIG. 8, a more general formula, corresponding to a stratified sampling of the device space, can be used to generate the sample data. FIG. 8 illustrates a stratified sampling of a hypothetical two-dimensional device space. Such stratified sampling can generally allow sampling of the device space at different sampling rates, depending on the dimension of the stratum. A general formula for the stratified sampling can be as follows:

$$\sum_{i=0}^{N} \binom{N}{i} \cdot n_i^i, \qquad \text{(Equation 2)}$$

where $n_i$+1 steps are used in sampling all i-dimensional strata. Using the above-mentioned example, this corresponds to the case N=6, $n_0$=1, $n_1$=$n_2$=$n_3$=51 and $n_4$=$n_5$=$n_6$=0. In general, a judicial choice of a stratified sampling can help to sample the important areas of the gamut while reducing the number of samples to a manageable number. In addition, 4 or more inks in an ink combination can be allowed, with the sampling rate for those combinations being reduced. For example, the values of N=6, $n_0$=1, $n_1$=$n_2$=255, $n_3$=51, $n_4$=17, $n_5$=$n_6$=0 can be used. This results in the inclusion of 4-ink combinations, but at a reduced sampling rate of 18 steps and a total "nominal" number of 4,882,741. The number is called "nominal" because of ink limiting, as explained in the following.

It should be noted that even when a maximum of 3 inks at a time is set, not all combinations are printable due to ink limiting. In fact, the actual printable ink combinations may be significantly lower in number. For example, after ink limiting is applied to a Canon i9900™ inkjet printer with 6 inks, the number of printable 3-ink combinations described above is typically reduced to 1,285,896, and the number of printable 4-ink combinations described above is typically reduced to 2,317,811.

Because of the large number of samples, it may not be practical to perform actual measurements. This is especially true if the device is a printer, meaning that color patches would need to be physically printed on paper and measured. Accordingly, a device model can first be established. In this regard, a device model is a mathematical representation of the physical device, based on collected measurement data. However, the number of measurement data needed for a device characterization, resulting in the device model, is typically considerably less than performing measurements for all samples, which can be in the order of millions of measurements. For example, in the case of a multi-ink printer, a Cellular Yule-Nielsen Spectral Neugebauer modeling method can be used successfully to model a printer based on spectral measurements of 4000 to 6000 color patches. Other techniques based on other physical ink mixing theories, such as the Kubelka-Munk theory, may also yield an acceptable printer device model. The device model, more specifically the forward device model, relates device values to the corresponding spectral reflectance. Thus, by invoking the forward device model on each of the printable 3-or-less-ink combinations, corresponding spectral reflectance data can be obtained.

Figure 9:
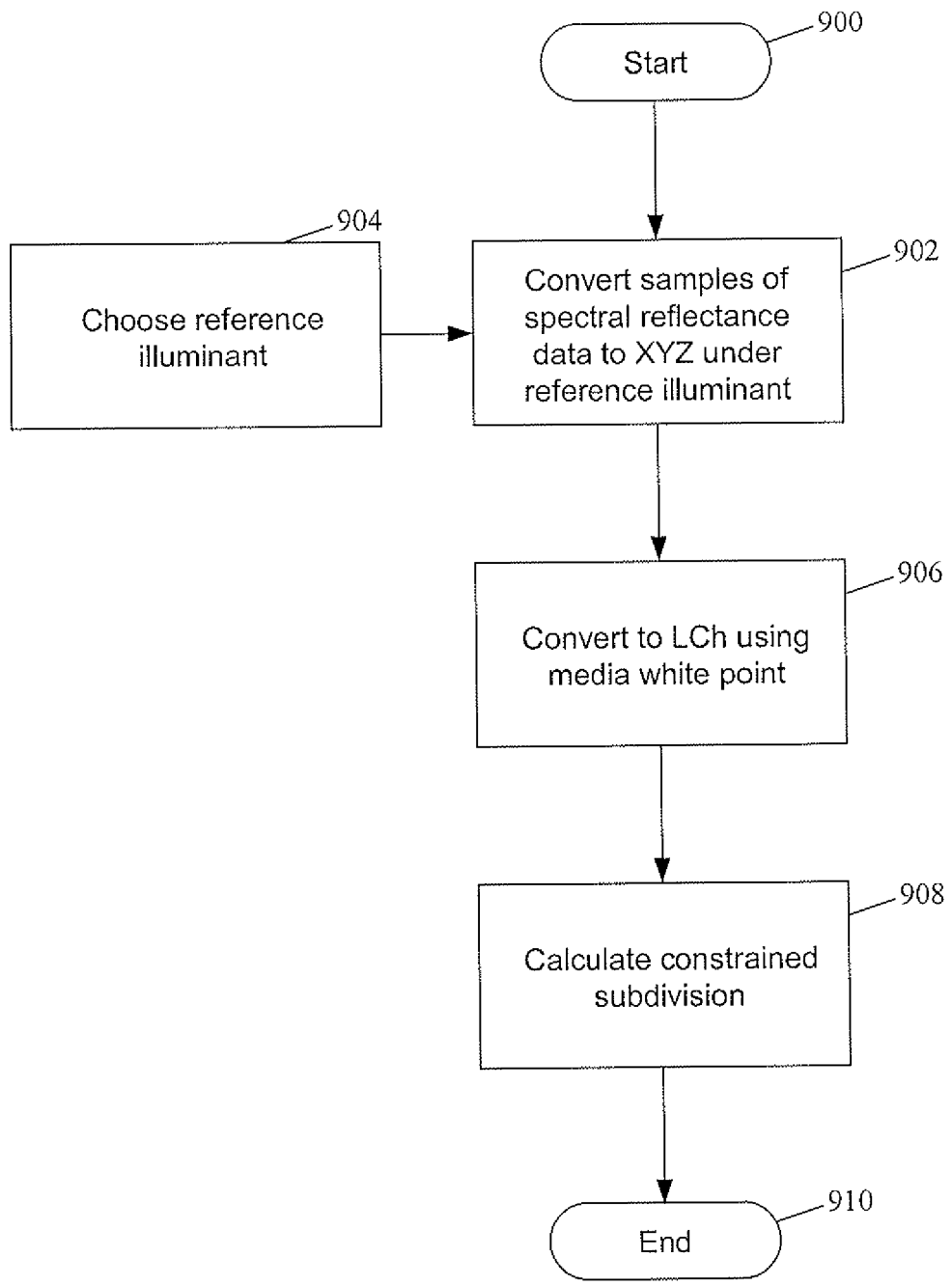
FIG. 9 is a flow diagram illustrating the general construction of a subdivision based on colorimetry according to an example embodiment.

FIG. 9 is a flow diagram illustrating the general construction of a subdivision based on colorimetry according to an example embodiment. In this and following examples, the set of samples consisting of the spectral reflectance data will be denoted by S. Further, the samples of set S span the spectral gamut. In this regard, to arrive at the samples of spectral reflectance data, the stratified sampling from FIG. 8 can be used to generate a set of samples (e.g., device values). The corresponding spectral reflectance arrays can in turn be generated using a spectral forward device model.

Based on the constrained mapping strategy, the samples of set S can be classified according to their colorimetry under a reference illuminant (e.g., $D_{50}$). More specifically, small, localized regions in the $D_{50}$ CIELCh space, not necessarily disjoint from each other, can be determined to cover the colorimetric gamut in LCh space. Samples of spectral reflectance data can then be classified into one or more of these regions based on their $D_{50}$ colorimetry. It should be noted that each of these local covering regions should contain approximately the same number of samples, so as to ensure sufficient representation in that region of the gamut.

As can be seen in FIG. 9, each of the samples in S will be converted to LCh under a chosen reference illuminant, and the constrained subdivisions will be calculated based on the LCh values and the set S. Following start bubble 900, each of the samples of spectral reflectance in set S is converted to XYZ under the reference illuminant (block 902), based on a chosen reference illuminant (block 904). The reference illuminant can be chosen, for example, to be $D_{50}$ or $D_{65}$. Mathematically, an illuminant can be described by its spectral power distribution (SPD), written as I($\lambda$), where $\lambda$ represents the wavelength. In practice, an SPD can be represented as an array of intensities sampled at different wavelengths similar to spectral reflectance. However, since an SPD is generally non-smooth (e.g., has spikes), the sampling is typically done at smaller intervals (e.g. every 1 nm). For example, an SPD can be represented as a 301-dimensional vector, corresponding to sampling from 400 nm to 700 nm at 1 nm intervals. As noted above with reference to block 902, the first step in the conversion is conversion to XYZ. If r($\lambda$) is the spectral reflectance in question, then CIE equations can be as follows:

$$X = \int_{400}^{700} r(\lambda) I(\lambda) \bar{x}(\lambda) d\lambda \qquad \text{(Equation 3)}$$

$$Y = \int_{400}^{700} r(\lambda) I(\lambda) \bar{y}(\lambda) d\lambda \qquad \text{(Equation 4)}$$

$$Z = \int_{400}^{700} r(\lambda) I(\lambda) \bar{z}(\lambda) d\lambda \qquad \text{(Equation 5)}$$

The integration can be done by discrete summation at 1 nm intervals. The illuminant and the CIE "standard observer" functions $\bar{x}$, $\bar{y}$ and $\bar{z}$ can typically be sampled at 1 nm intervals from the onset, while the spectral reflectance r($\lambda$) can be re-sampled at 1 nm intervals (if it is originally sampled at 10 nm intervals), using interpolation techniques (e.g., linear interpolation).

Following block 902, the XYZ values can be converted to LCh using the media white point (block 906). The media white point is typically preferred to the white point of the reference illuminant in this conversion, because the resulting LCh gamut will typically have its neutral axis aligned with the L* axis. In particular, the media white point will typically have an LCh of (100, 0, 0). The media white point is the XYZ of the white color patch. In the case of a printer, this corresponds to no colorants. Most conveniently, it can be arranged to be the first sample in the sample set S. If the media white point is $X_0, Y_0, Z_0$, then values for Lab can be calculated as follows:

$$L^* = 116 f(Y/Y_0) - 16 \quad \text{(Equation 6)}$$

$$a^* = 500[f(X/X_0) - f(Y/Y_0)] \quad \text{(Equation 7)}$$

$$b^* = 200[f(Y/Y_0) - f(Z/Z_0)] \quad \text{(Equation 8)}$$

$$\text{where } f(x) = \begin{cases} x^{1/3} & \text{if } x > \left(\frac{6}{29}\right)^3 \\ \frac{1}{3}\left(\frac{29}{6}\right)^2 x + \frac{4}{29} & \text{if } x \leq \left(\frac{6}{29}\right)^3 \end{cases} \quad \text{(Equation 9)}$$

Further, values for LCh, corresponding to the cylindrical coordinates for Lab, can be calculated as follows:

$$C_{ab}^* = \sqrt{a^{*2} + b^{*2}} \quad \text{(Equation 10)}$$

$$h_{ab} = \arctan(b^*/a^*) \quad \text{(Equation 11)}$$

For convenience, the set of LCh values converted from the spectral reflectance arrays in S will be denoted by $\hat{S}$.

Following block 906, the constrained subdivision can be calculated based on the LCh values and the original set of samples of spectral reflectance data (block 908). The process then ends (end block 910).

In determining the constrained subdivision, the general strategy is to treat the following two cases separately: the near-neutral samples (e.g., the neutral spine), and samples falling on a hue angle (e.g., on a hue leaf). In this regard, it should be noted that samples with small chroma may have a hue angle that is noisy and thus, it is desirable to treat them separately instead of classifying them by their hue angles.

Figure 10:
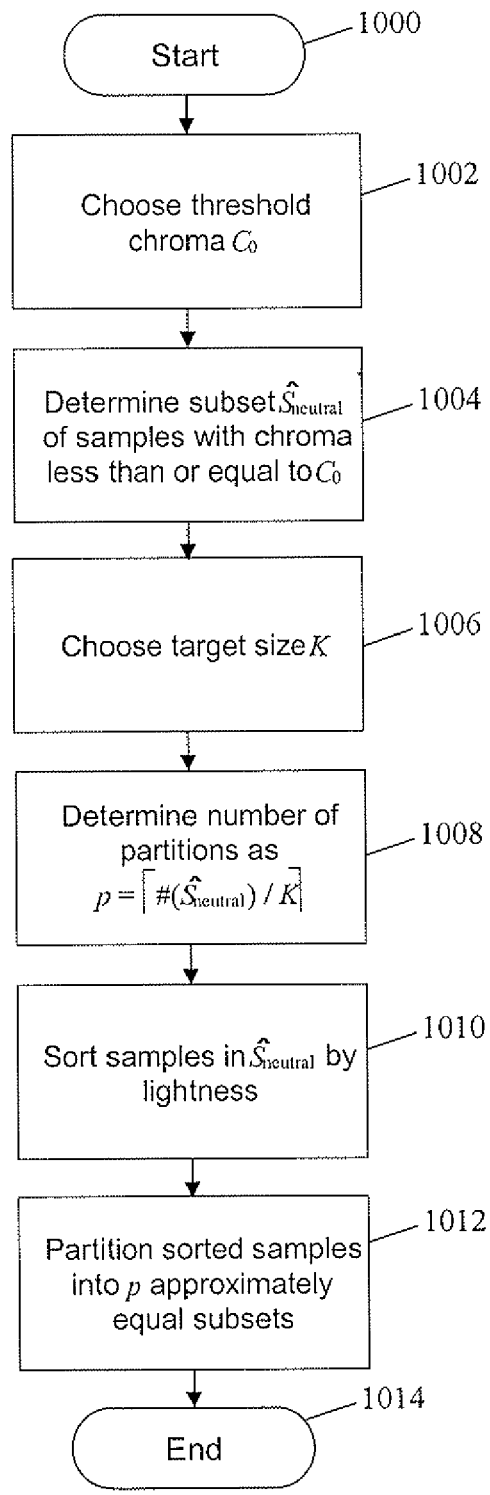
FIG. 10 is a flow diagram illustrating the construction of a subdivision using the neutral spine according to an example embodiment.

FIG. 10 is a flow diagram illustrating the construction of a subdivision using the neutral spine according to an example embodiment. Following start block 1000, a threshold chroma $C_0$ can be chosen for the chroma (e.g., $C_0=3$) at block 1002. Further, a subset $\hat{S}_{neutral}$ of $\hat{S}$, corresponding to chroma less than or equal to $C_0$ can be determine (block 1004) as follows:

$$\hat{S}_{neutral} = \{s \in \hat{S} | C_{ab}^*(s) \leq C_0\} \quad \text{(Equation 12)}$$

When referring to a sample s in $\hat{S}$, it typically refers to an index into $\hat{S}$. In this example implementation, memory space can be saved by storing the index rather than storing the 3-tuple of LCh or 31-tuple of spectral reflectance. The notation $C_{ab}^*(S)$ denotes the chroma of the samples in $D_{50}$ LCh space.

$\hat{S}_{neutral}$ can be partitioned into regions with approximately an equal number of samples. At block 1006 of FIG. 10, a target size K can be chosen (e.g., K=300). Next, the number of partitions p can be determined (block 1008). For example, if the total number of samples in $\hat{S}_{neutral}$ is m, then the number of covering regions for the neutral spine is $p = \lceil m/K \rceil$, where

[x] the ceiling operator that returns the smallest integer greater than or equal to the given number x. In this case, because the neutral spine is typically parameterized by lightness L* only, the covering regions can be defined by successive intervals of lightness. Further, the intervals can be obtained by sorting the samples in $\hat{S}_{neutral}$ by lightness (e.g., L*) in ascending order (block 1010), and by splitting the sorted samples into p subsets (block 1012). The process of FIG. 10 then ends (end block 1014).

Figure 11:
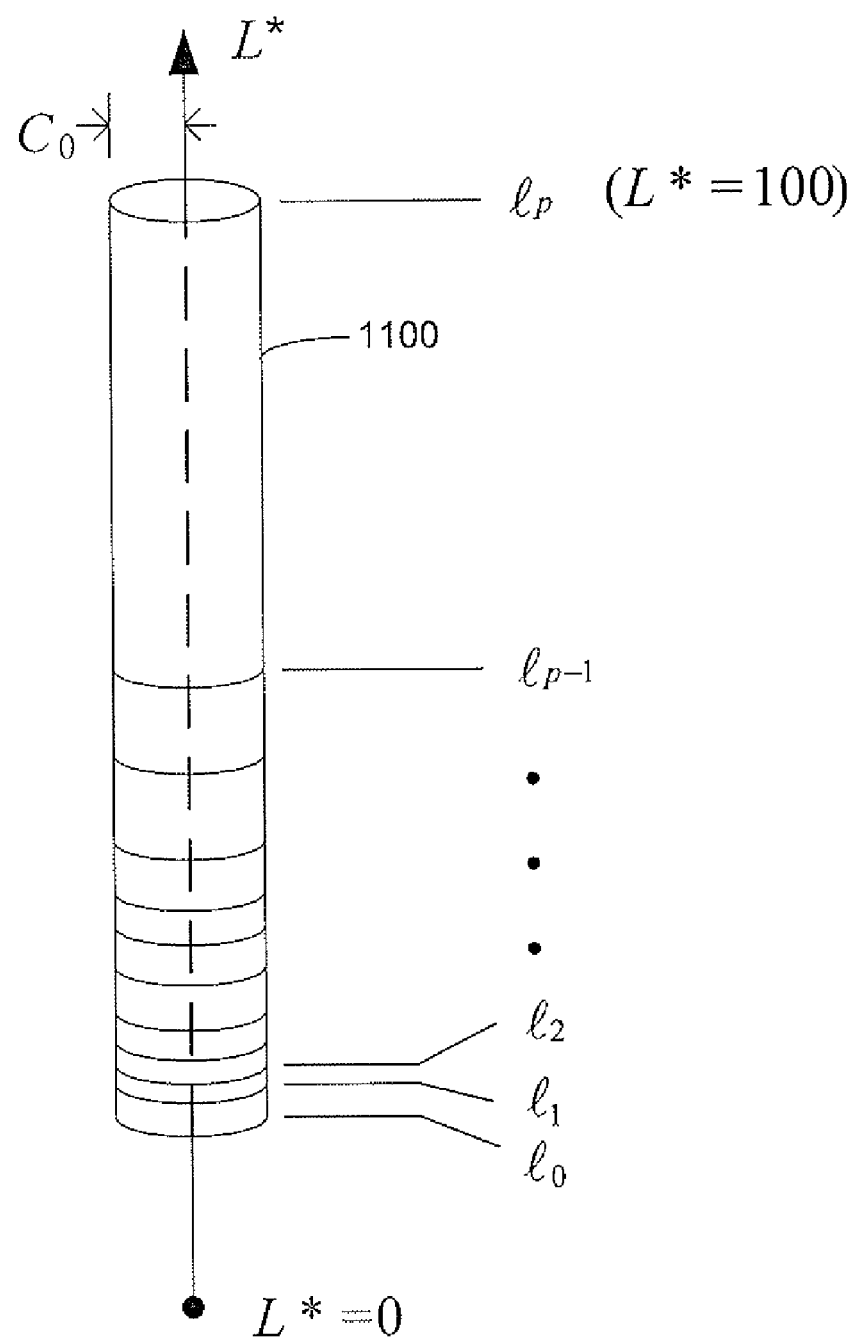
FIG. 11 is a representative view of a neutral spine as it relates to the determination of a subdivision according to an example embodiment.

FIG. 11 is a representative view of a resulting neutral spine 1100. As can be seen in FIG. 11, a set of ascending values in L*, $l_0 < l_1 < \ldots < l_p = 100$ can be obtained, and neutral spine 1100 can be subdivided into p regions, each containing approximately K samples. The samples (e.g., indices) in each covering region can also be duly recorded. While $l_p$ is generally equal to 100 because the choice of the white point for the LCh space, $l_0$ is generally not zero, but rather corresponds to the darkest color possible from the device. Of course, other values for $l_p$ can be used.

With reference to FIGS. 10 and 11, in one example of splitting the sorted samples, the breakpoints, described in terms of the ordinal numbers of the sorted samples, can be determined by:

$$1, \left[\frac{m-1}{p}\right]+1, \left[\frac{2(m-1)}{p}\right]+1, \left[\frac{3(m-1)}{p}\right]+1, \quad \text{(Equation 13)}$$
$$\ldots, \left[\frac{(p-1)(m-1)}{p}\right]+1, m$$

where [x] denotes a rounding operator that returns the closest integer to x. The $l_0, l_1, \ldots, l_p$ can correspond to these breakpoints. Furthermore, the samples in the p regions can be described in terms of the ordinal numbers of the sorted samples, as follows:

$$1st \text{ region: } 1, 2, \ldots, \left[\frac{m-1}{p}\right] \quad \text{(Equation 14)}$$

$$2nd \text{ region: } \left[\frac{m-1}{p}\right]+1, \left[\frac{m-1}{p}\right]+2, \ldots, \left[\frac{2(m-1)}{p}\right]$$

$$3rd \text{ region: } \left[\frac{2(m-1)}{p}\right]+1, \left[\frac{2(m-1)}{p}\right]+2,$$
$$\ldots, \left[\frac{3(m-1)}{p}\right]$$

$$\vdots$$

$$(p-1)st \text{ region: } \left[\frac{(p-2)(m-1)}{p}\right]+$$
$$1, \left[\frac{(p-2)(m-1)}{p}\right]+2, \ldots, \left[\frac{(p-1)(m-1)}{p}\right]$$

$$pth \text{ region: } \left[\frac{(p-1)(m-1)}{p}\right]+1, \left[\frac{(p-1)(m-1)}{p}\right]+2,$$
$$\ldots, m$$

As noted above, in determining the constrained subdivision, the near-neutral samples (e.g., the neutral spine) and the samples falling on a hue angle (e.g., on a hue leaf) can be treated separately. In this regard, FIG. 12 is a flow diagram illustrating the construction of a subdivision using hue leaves according to an example embodiment.

Figure 12:
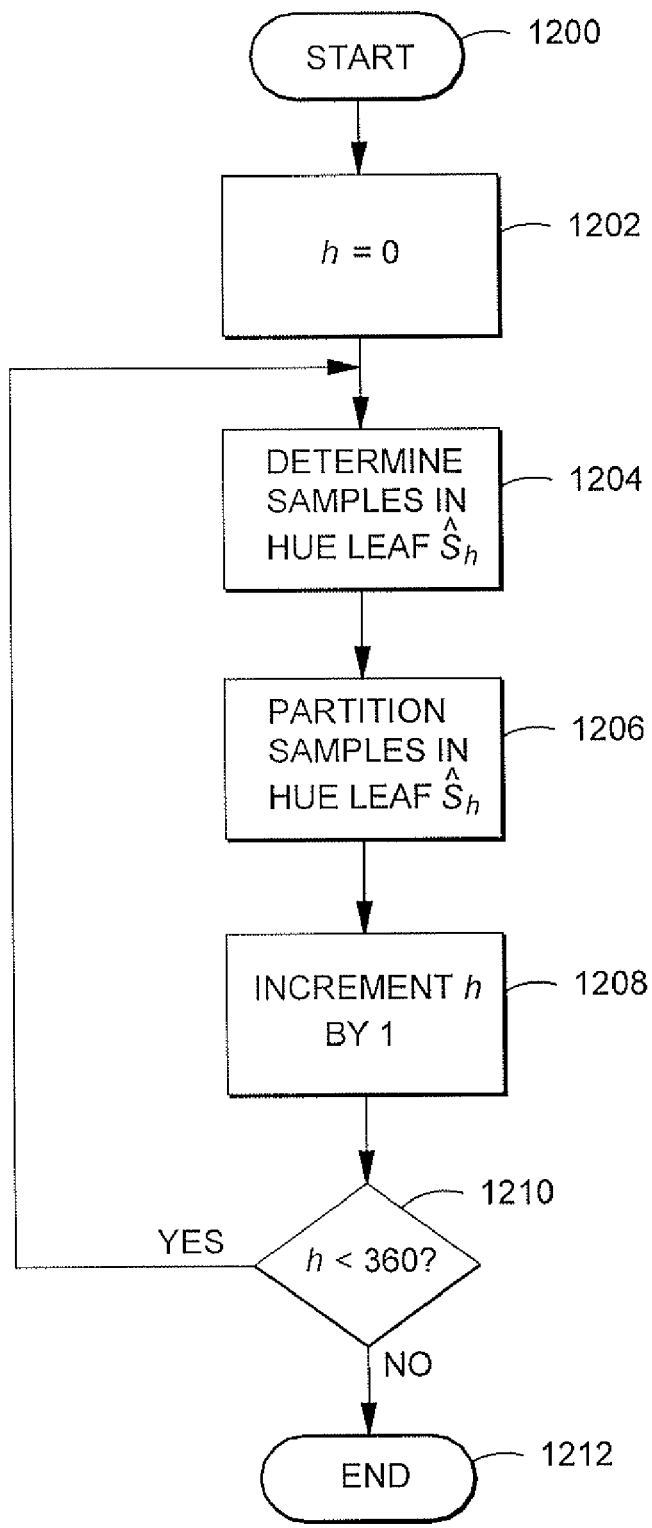
FIG. 12 is a flow diagram illustrating the construction of a subdivision using hue leaves according to an example embodiment.

In the example of FIG. 12, 360 hue leaves are partitioned. Of course, a different number of hue leaves can be used. Following start block 1200, a target hue h is initialized to 0

(block 1202). While hue h is initialized at 0, its value is incremented from 0 . . . 359 (see decision diamond 1210 and block 1208). Samples in hue leaf $\hat{S}_h$ can be determined (block 1204) and the samples in hue leaf $\hat{S}_h$ can be partitioned (block 1206). Once all hues from 0 to 359 have been considered, the process ends (end block 1212).

In this regard, with reference to a given hue leaf, for integers hue h=0, 1, 2, . . . , 359, a subset $\hat{S}_h$ of $\hat{S}$ can be determined, and can be defined as follows:

$$\hat{S}_h = \{s \in \hat{S} \mid |h_{ab}(s) - h| \leq 1\} \quad \text{(Equation 15)}$$

Figure 13:
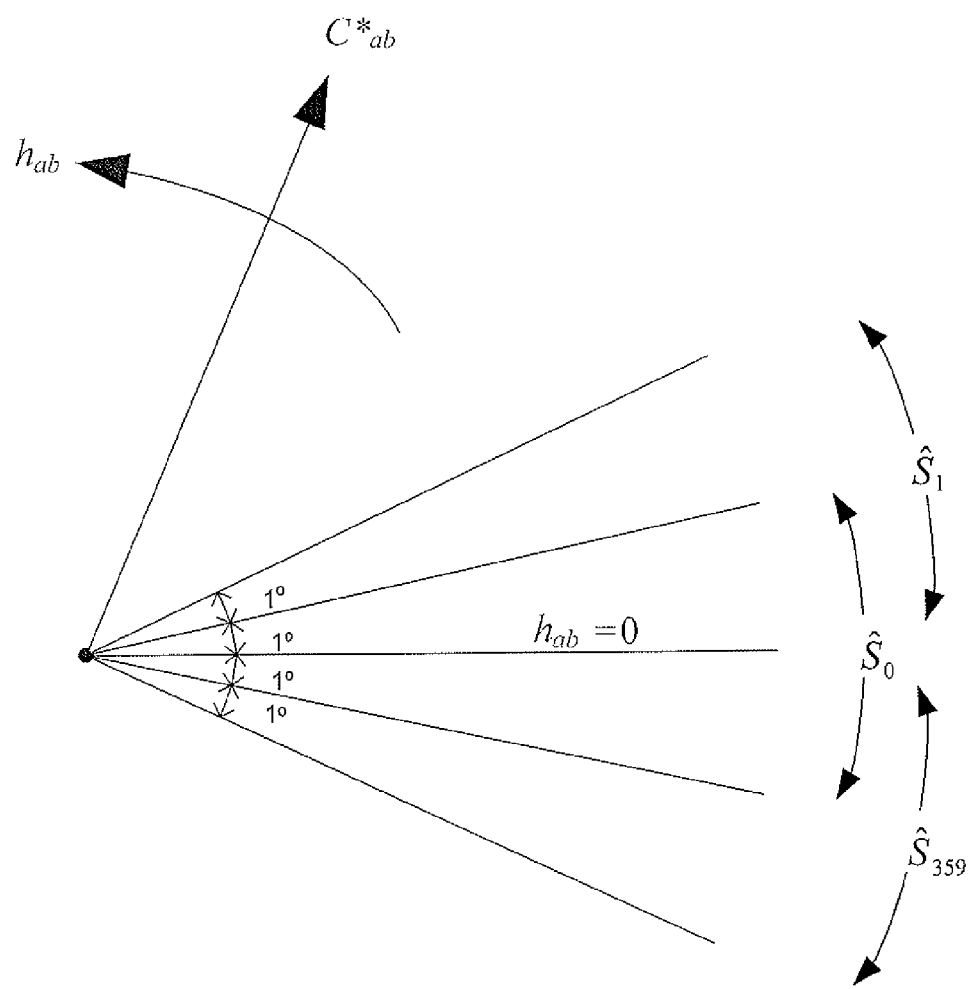
FIG. 13 is a representative view of hue angles as they relate to the determination of a subdivision according to an example embodiment.

In other words, sample points with a hue angle within 1 degree from the target hue h can be included, as illustrated in FIG. 13. In Equation (15), the notation $h_{ab}(s)$ is used to denote the hue angle of a sample s in $D_{50}$ LCh space. The overlap between the hue leaves can smooth out the variation of the point distribution as the hue is varied.

Figure 14:
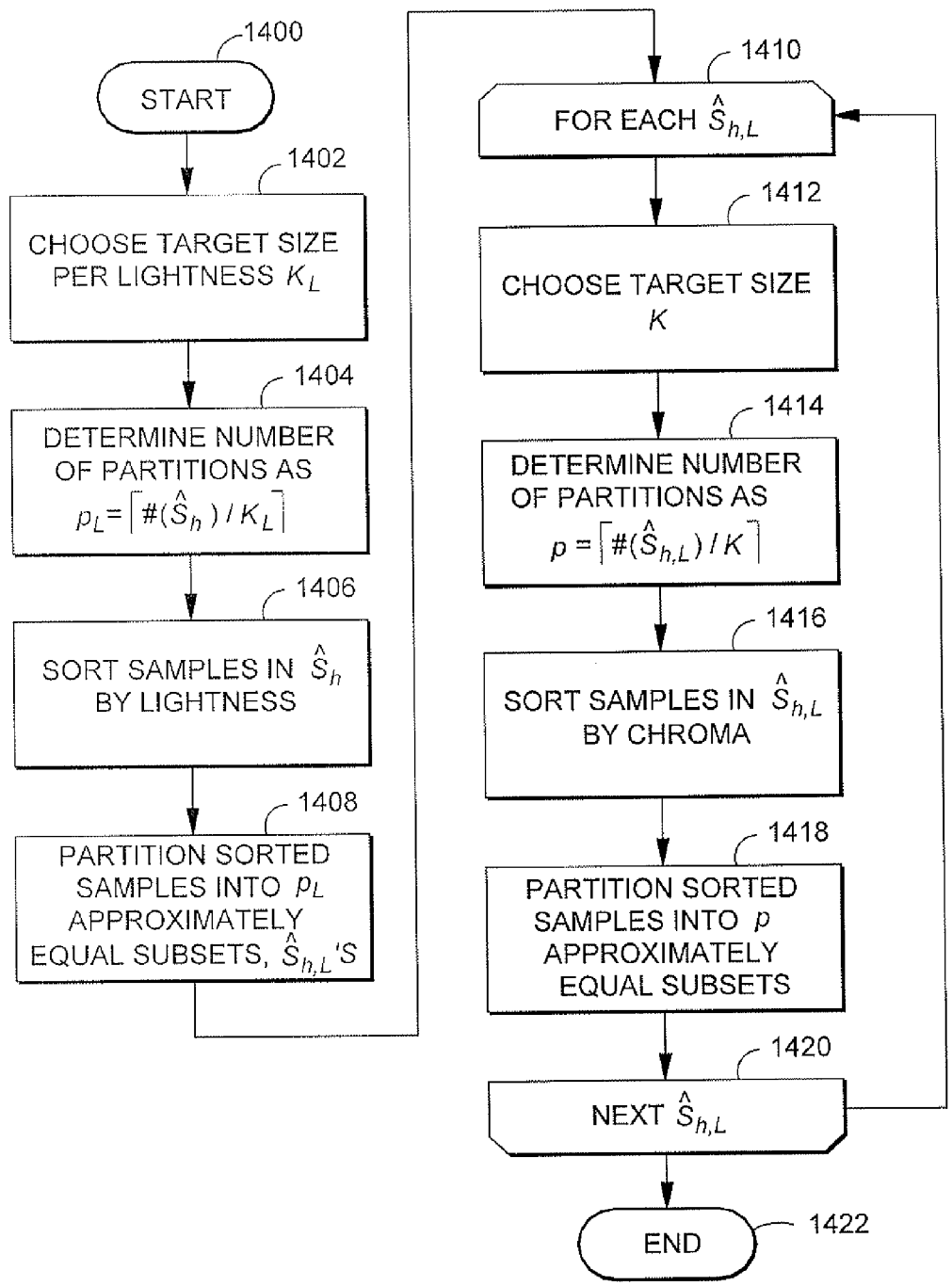
FIG. 14 is a flow diagram further illustrating the partitioning of samples in a hue leaf according to an example embodiment.

FIG. 14 is a flow diagram further illustrating the partitioning of samples in a hue leaf according to an example embodiment. In other words, FIG. 14 can be seen to provide description for block 1206 of FIG. 12.

Figure 15A:
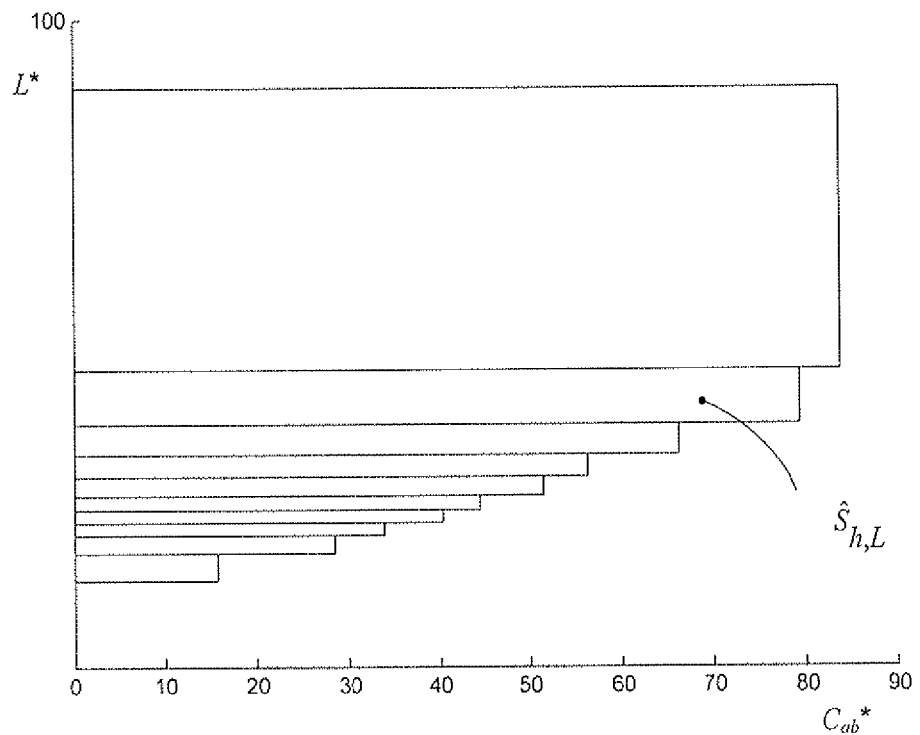
FIGS. 15A and 15B are diagrams illustrating the subdivision of hue leaves according to an example embodiment.

Following start block 1400, given a hue leaf $\hat{S}_h$, a target size per lightness $K_L$ lightness is chosen (block 1402). A number of partitions is determined as $p_L = \lceil \#(\hat{S}_h)/K_L \rceil$ (block 1404). Samples in $\hat{S}_h$ are sorted by lightness (block 1408). Sorted samples in $p_L$ in are partitioned into approximately equal subsets $\hat{S}_{h,L}$'s (block 1408). In other words, the subset $\hat{S}_h$ is partitioned into subsets of approximately equal number of samples of a target size (e.g., 500) based on the lightness (e.g., L*). This process can be similar to the neutral spine case and involves sorting the samples in L* in ascending order and splitting the sorted samples. FIG. 15A illustrates the subdivision at this point.

Next, in the loop defined by blocks 1410 and 1420, for each $\hat{S}_{h,L}$, a target size K is chosen (block 1412), the number of partitions is defined by $p = |\#(\hat{S}_{h,L})/K|$ (block 1414), the samples in $\hat{S}_{h,L}$ are sorted by chroma (block 1416), and the sorted samples are partitioned into p approximately equal subsets (block 1418). The result corresponds to the partitioned hue leaf. The process then ends (end block 1422).

Figure 15B:
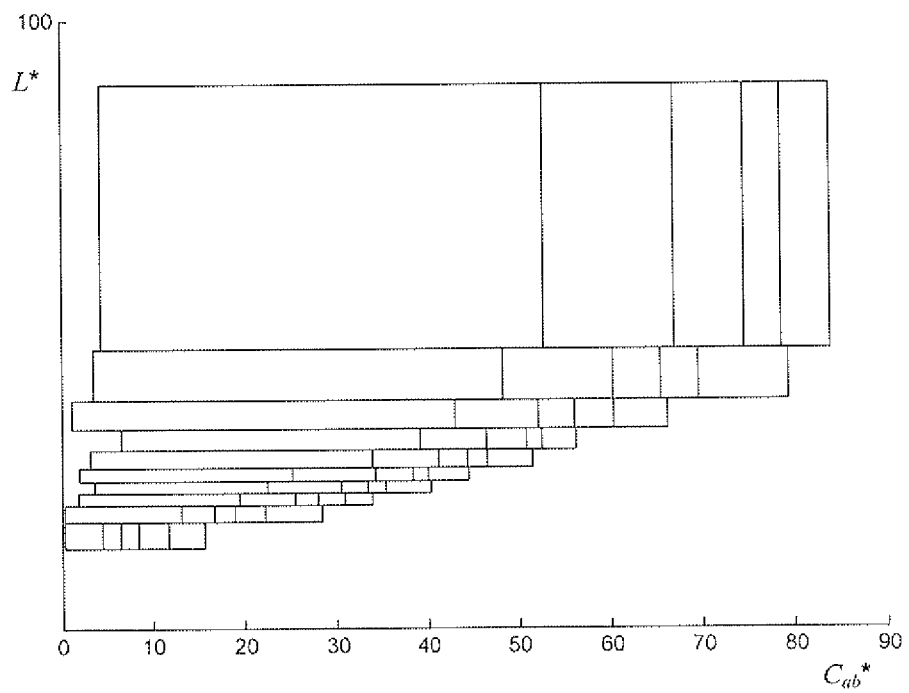
Figure 16:
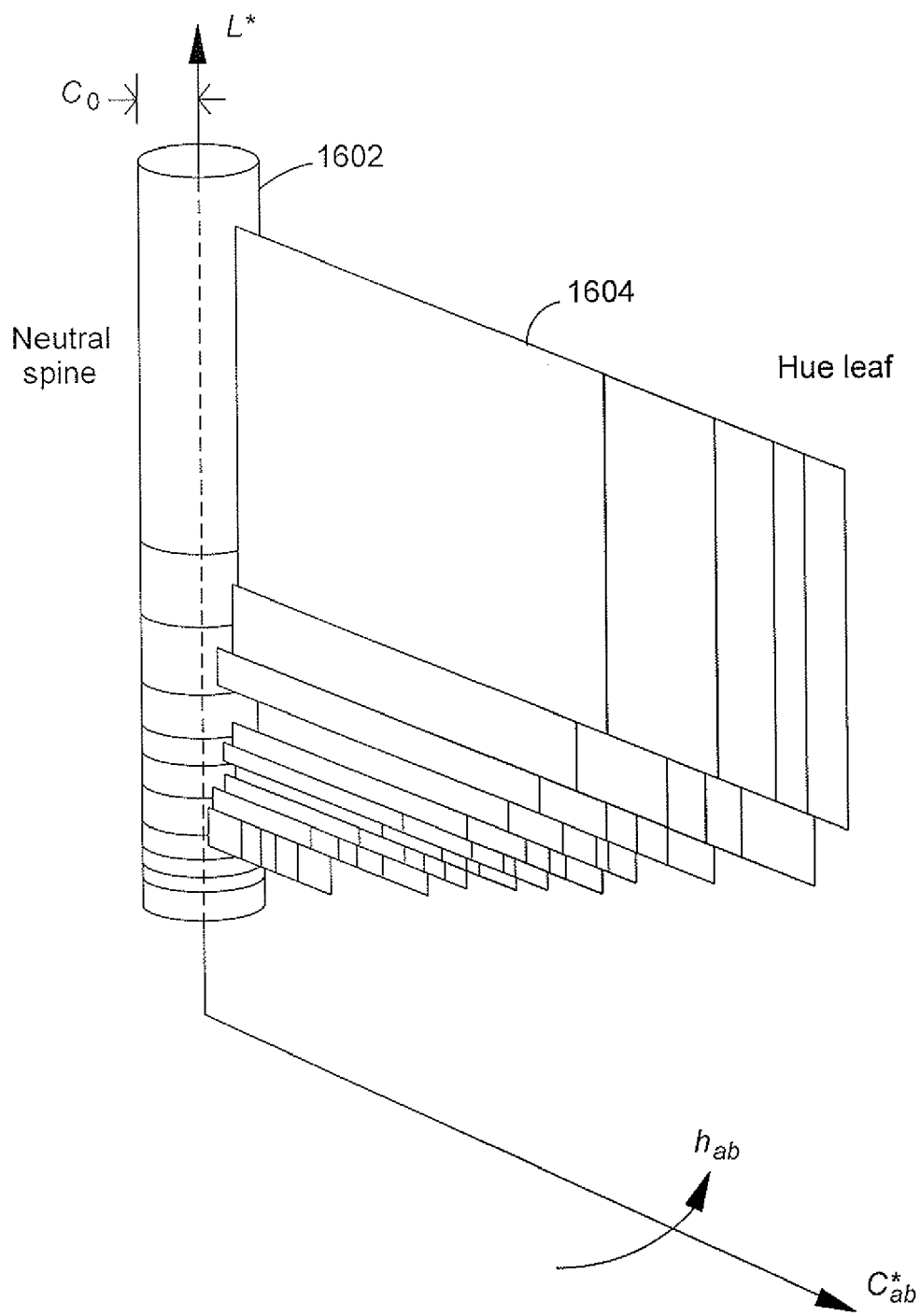
FIG. 16 is a representative view of the relationship between the neutral spine and the hue leaves according to an example embodiment.

In other words, one of the subsets, $\hat{S}_{h,L}$, can be selected. For example, $\hat{S}_{h,L}$ can consist of samples with hue angle around the given hue h and lightness in a bracketed range. The samples in this set can be sorted in ascending values of chroma and partitioned into regions with approximately equal number of samples of a target size (e.g., 100). After this step is performed on each of the subsets $\hat{S}_{h,L}$ the whole hue leaf can be partitioned into regions of approximately 100 samples, with approximately 6 subsets in a given lightness range. This is illustrated in FIG. 15B. The samples (e.g., indices) in each covering region can also be recorded. Furthermore, FIG. 16 depicts the relationship between the neutral spine 1602 and the hue leaves 1604 according to an example embodiment.

Figure 17:
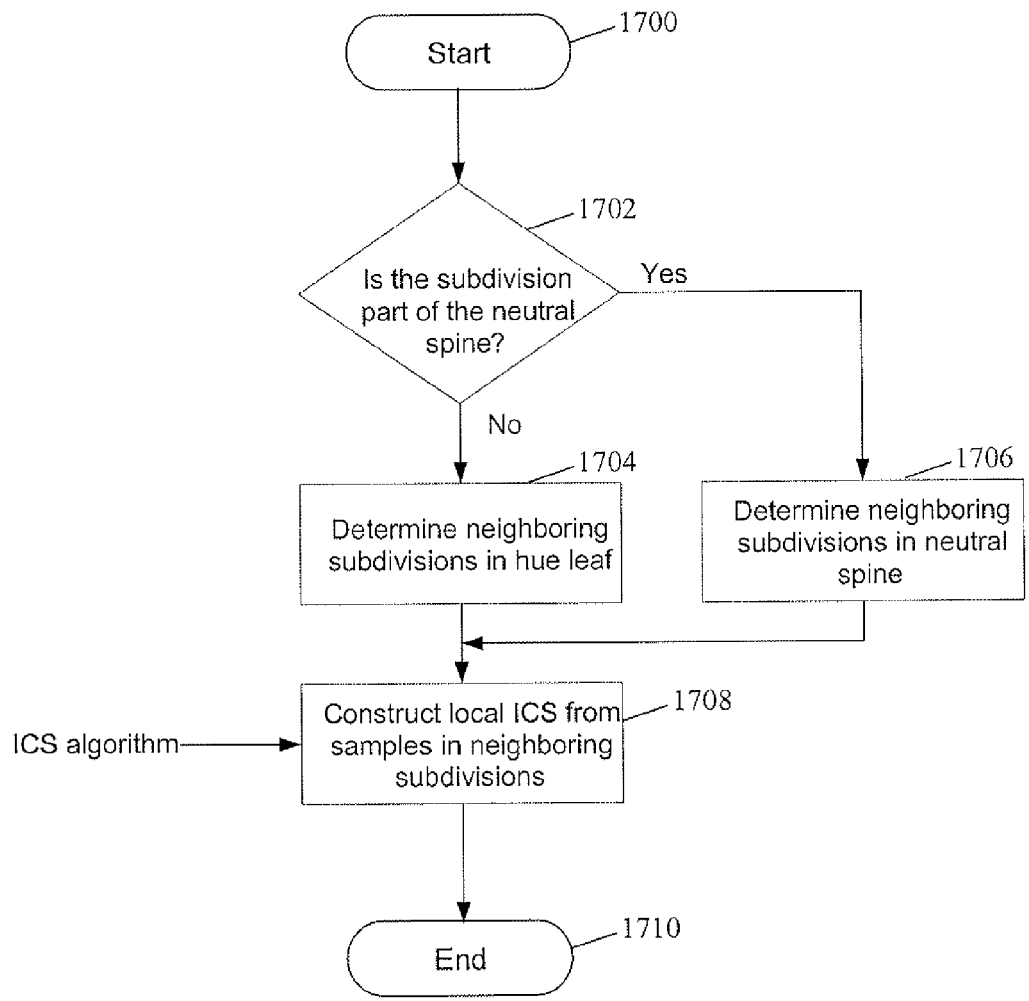
FIG. 17 is a flow diagram illustrating the construction of a local ICS according to an example embodiment.

FIG. 17 is a flow diagram illustrating the construction of a local ICS according to an example embodiment. In this regard, each of the subdivisions in the neutral spine or hue leaves can be associated with a local ICS and a sub-gamut. Before discussing the construction of a local ICS and corresponding sub-gamut, a brief explanation relating to interim connection space (ICS) will be provided.

ICS can be considered a generalization of basis functions, which in turn is a generation of the classical Fourier series expansion. In the context of spectral color imaging, a set of basis functions consists of orthonormal functions $\{b_1(\lambda), b_2(\lambda), \ldots, b_n(\lambda)\}$ of wavelength $\lambda$, where "orthonormal" means that the basis functions are mutually orthogonal, and each has unit length. In other words, $$\int_{400}^{700} b_i(\lambda) b_j(\lambda) d\lambda = \begin{cases} 0 & \text{if } i \neq j \\ 1 & \text{if } i = j. \end{cases} \quad \text{(Equation 16)}$$

A spectral reflectance $r(\lambda)$ can then be expanded as follows:

$$r(\lambda) = c_1 b_1(\lambda) + c_2 b_2(\lambda) + \ldots + c_n b_n(\lambda) \quad \text{(Equation 17)}$$

where the coefficients are defined by $$c_i(\lambda) = \int_{400}^{700} r(\lambda) b_i(\lambda) d\lambda. \quad \text{(Equation 18)}$$

The coordinates $c_1, c_2, \ldots, c_n$ can be considered to be describing a point in a space. Generalizing this such that the method of generating the coordinates is not restricted to one arising from basis functions, a more general notion of an ICS can be realized. More particularly, to define an ICS, a method to convert spectral reflectance data to ICS data, denoted by P, and a method to convert ICS data to spectral reflectance data, denoted by Q, should typically be provided. For an ICS arising from basis functions, the above equations for $c_i(\lambda)$ and $r(\lambda)$ respectively provide the algorithms for P and Q, and are linear transformations. In general, P and Q can be nonlinear transformations. Examples of such nonlinear transformations include LabPQR and LabRGB. Of course, many choices of the transformation P and Q are possible, with each choice typically giving rise to a different ICS. Each choice shall be referred to as an "ICS algorithm". Each ICS algorithm typically has different performance, where performance can be measured by various means. For example, round-trip error can be used as a metric. In more detail, given a spectral reflectance $(\lambda)$, conversion to ICS and conversion back to spectral reflectance typically results in a truncated spectral reflectance $s(\lambda) = Q(P(r(\lambda)))$. The difference between r and s can be considered a measure of the accuracy of the ICS, with there being numerous ways to measure the difference between two spectral reflectances. For instance, the spectral RMS error can be used. A more meaningful metric that correlates with visual error is a delta-E under an illuminant, such as $D_{50}$. Alternatively, delta-E's under multiple illuminants can be considered.

For example, one ICS algorithm can give rise to an ICS called $I_n$, where the dimension of the ICS to be constructed is n. More particularly, an initial set of samples of spectral reflectance data can be obtained, either by direct measurements or by generation by a forward device model. In the following description, such data is arranged as a 31×M matrix C, where M is the number of samples, and 31 is the number of spectral bands from 400 nm to 700 nm at every 10 nm interval. It should be noted that the number of spectral bands can be different, depending on the start wavelength or end wavelength or the length of the sampling interval. Another input to the algorithm is a set of m illuminants $I_1(\lambda), I_2(\lambda), \ldots, I_m(\lambda)$. For example, this can be a fixed list $D_{50}$, A, F2, F7, F11, with only the first m illuminants being used, and with m being determined by n, the dimension of the ICS that is being constructed. For example, if n=6, then m=$\lceil n/3 \rceil$=2, and $D_{50}$ and A can be used.

The illuminants give rise to a 3m×31 matrix A, defined as:

$$A = \begin{pmatrix} \int_{400}^{700}\delta(\lambda-400)I_1(\lambda)\bar{x}(\lambda)d\lambda & \int_{400}^{700}\delta(\lambda-410)I_1(\lambda)\bar{x}(\lambda)d\lambda & \cdots & \int_{400}^{700}\delta(\lambda-700)I_1(\lambda)\bar{x}(\lambda)d\lambda \\ \int_{400}^{700}\delta(\lambda-400)I_1(\lambda)\bar{y}(\lambda)d\lambda & \int_{400}^{700}\delta(\lambda-410)I_1(\lambda)\bar{y}(\lambda)d\lambda & \cdots & \int_{400}^{700}\delta(\lambda-700)I_1(\lambda)\bar{y}(\lambda)d\lambda \\ \int_{400}^{700}\delta(\lambda-400)I_1(\lambda)\bar{z}(\lambda)d\lambda & \int_{400}^{700}\delta(\lambda-410)I_1(\lambda)\bar{z}(\lambda)d\lambda & \cdots & \int_{400}^{700}\delta(\lambda-700)I_1(\lambda)\bar{z}(\lambda)d\lambda \\ \vdots & \vdots & \ddots & \vdots \\ \int_{400}^{700}\delta(\lambda-400)I_m(\lambda)\bar{x}(\lambda)d\lambda & \int_{400}^{700}\delta(\lambda-410)I_m(\lambda)\bar{x}(\lambda)d\lambda & \cdots & \int_{400}^{700}\delta(\lambda-700)I_m(\lambda)\bar{x}(\lambda)d\lambda \\ \int_{400}^{700}\delta(\lambda-400)I_m(\lambda)\bar{y}(\lambda)d\lambda & \int_{400}^{700}\delta(\lambda-410)I_m(\lambda)\bar{y}(\lambda)d\lambda & \cdots & \int_{400}^{700}\delta(\lambda-700)I_m(\lambda)\bar{y}(\lambda)d\lambda \\ \int_{400}^{700}\delta(\lambda-400)I_m(\lambda)\bar{z}(\lambda)d\lambda & \int_{400}^{700}\delta(\lambda-410)I_m(\lambda)\bar{z}(\lambda)d\lambda & \cdots & \int_{400}^{700}\delta(\lambda-700)I_m(\lambda)\bar{z}(\lambda)d\lambda \end{pmatrix}$$

(Equation 19)

in which $\delta(\lambda-\lambda_0)$ is the discrete delta function centered at wavelength $\lambda_0$. Singular value decomposition (SVD) of the matrix product AC can then be calculated as follows:

$$AC = U_1 D_1 V_1^T,$$

where $U_1$ is a 3m×3m orthogonal matrix, $D_1$ is a 3m×3m diagonal matrix of singular values, and $V_1$ is an 3m×M orthogonal matrix. It should be noted that this singular value decomposition can correspond with an economical form, in which no matrix of order M×M appears. This form can be used because M may be a large number, possibly of the order of millions. Thus, the presence of matrices of order M×M may require a considerable amount of memory, such that SVD in full form may fail on some computers. Further, $D_1$ can be of the form:

$$D_1 = \begin{pmatrix} d_1 & 0 & \cdots & \cdots & 0 \\ 0 & d_2 & 0 & \cdots & 0 \\ \vdots & \ddots & \ddots & \ddots & \vdots \\ \vdots & & \ddots & \ddots & 0 \\ 0 & \cdots & \cdots & 0 & d_{3m} \end{pmatrix}$$

(Equation 20)

In addition, its truncated inverse can be defined and denoted $D_1^x$, as the 3m×3m matrix as follows:

$$D_1^x = \begin{pmatrix} d_1^{-1} & 0 & \cdots & \cdots & \cdots & \cdots & 0 \\ 0 & d_2^{-1} & 0 & \cdots & \cdots & \cdots & 0 \\ \vdots & \ddots & \ddots & \ddots & & & \vdots \\ \vdots & & \ddots & d_n^{-1} & 0 & & \vdots \\ \vdots & & & 0 & 0 & \ddots & \vdots \\ \vdots & & & & \ddots & \ddots & 0 \\ 0 & \cdots & \cdots & \cdots & \cdots & 0 & 0 \end{pmatrix}$$

(Equation 21)

By taking the first n columns of the matrix product $CV_1$ and denoting the resulting matrix $CV_1(*,1 \ldots n)$, a second singular value decomposition can be calculated:

$$CV_1(*,1 \ldots n) = U_2 D_2 V_2^T \qquad \text{(Equation 22)}$$

The matrices $U_2, D_2, V_2$ have dimensions 31×31, 31×n and n×n, respectively. The transformation Q defining the conversion from ICS to spectral reflectance can be defined to be the matrix obtained by taking the first n columns of $U_2$:

$$Q = U_2(*,1 \ldots n) \qquad \text{(Equation 23)}$$

The transformation P defining the conversion from spectral reflectance to ICS is defined to be the matrix:

$$P = Q^T C V_1 D_1^x U_1^T A. \qquad \text{(Equation 24)}$$

Thus, the L space can be provided.

Referring back to FIG. 6, block 610 for constructing a local ICS will now be described in greater detail. In this regard, with the construction of the constrained subdivision, each subdivision will be associated with an ICS. The steps are illustrated in FIG. 17.

Following start block 1700, a determination is made whether a particular subdivision is part of the neutral spine (decision diamond 1702). For a given subdivision, it may belong to the neutral spine or a hue leaf. In either case, the neighboring subdivisions should be determined. The reason for this is because, if only the samples from the subdivision itself are used, then there may be abrupt changes in the sample point distribution from subdivision to subdivision. By also taking the samples in the neighboring subdivisions, the sample point distribution tends to vary more smoothly from subdivision to subdivision, which implies a smooth transition of sub-gamuts. The procedure for determining the neighboring subdivisions is different for neutral spine and hue leaves.

Figure 18:
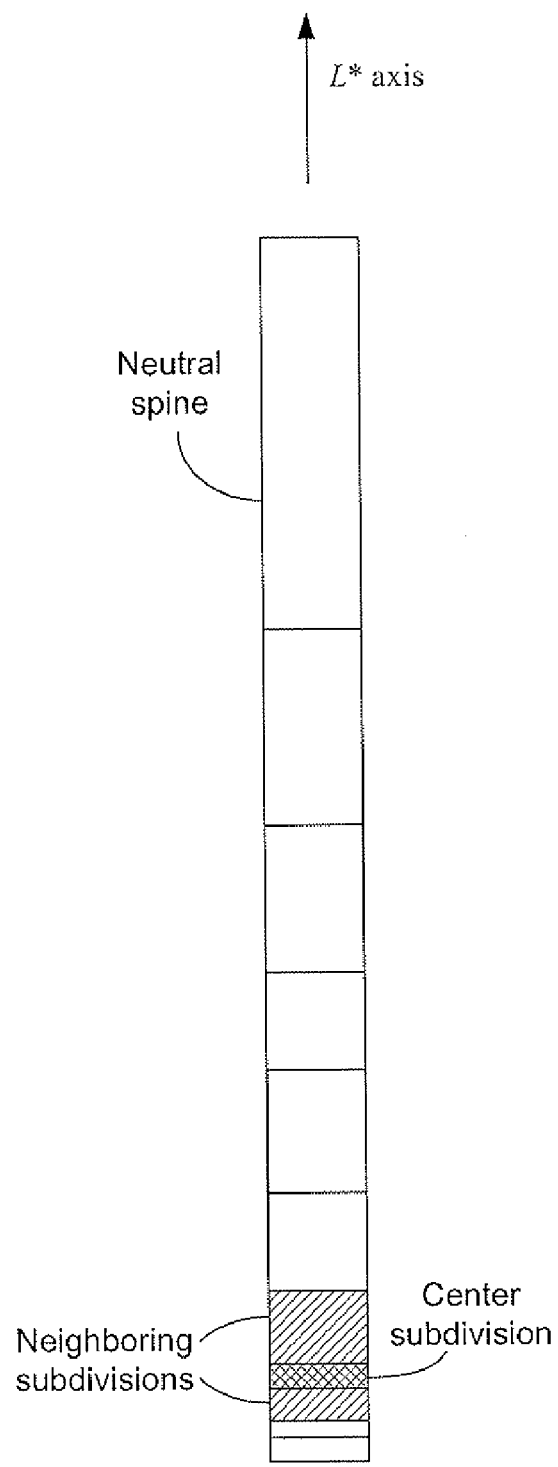
FIG. 18 is a representative view of a neutral spine as it relates to the construction of a local ICS according to an example embodiment.

Accordingly, if the answer to the inquiry from decision diamond 1702 is yes, a determination is made whether neighboring subdivisions are in the neutral spine (block 1706). In this regard, FIG. 18 is a representative view of a neutral spine. In the case of neutral spine, the neighboring subdivisions are simply taken to be the previous and the next subdivisions of the current subdivision (or center subdivision). If the center subdivision is the first subdivision, then the only neighboring subdivision is the next subdivision. Also, if the center subdivision is the last subdivision, then the only neighboring subdivision is the previous subdivision.

Figure 19:
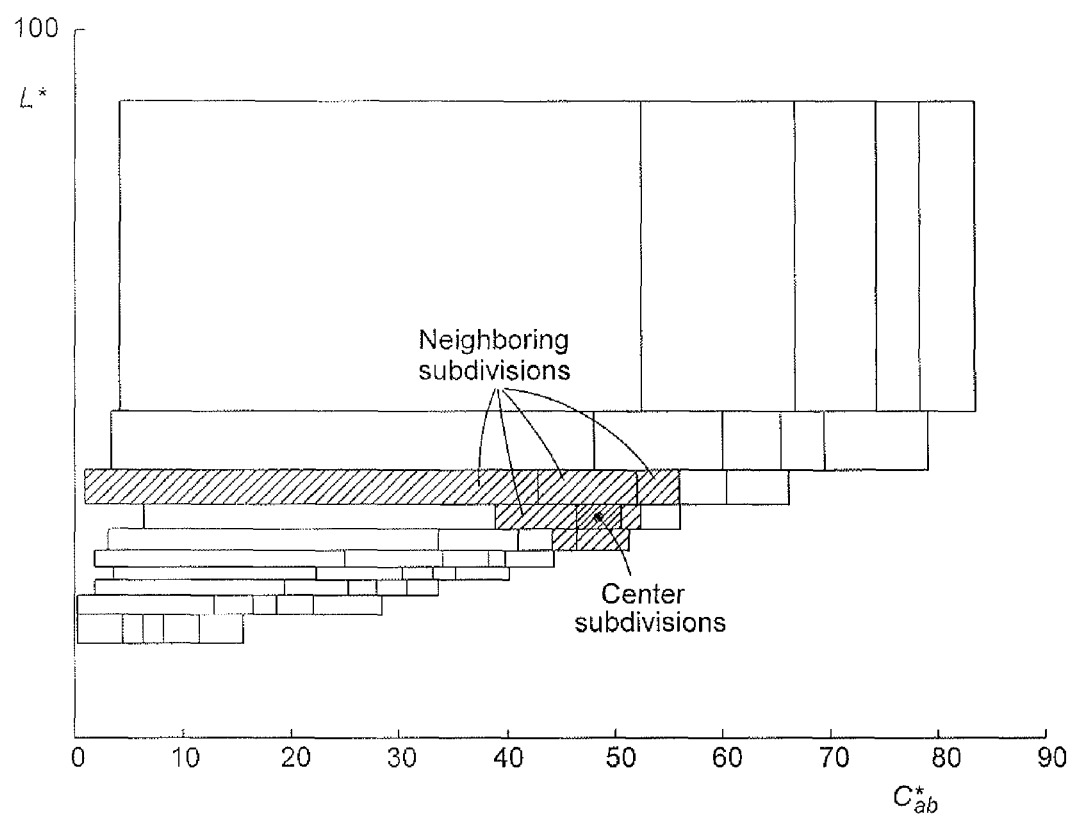
FIG. 19 is a representative view of hue leaves as they relate to the construction of a local ICS according to an example embodiment.

If the answer to the inquiry from decision diamond 1702 is no, a determination is made whether neighboring subdivisions are within the hue leaf (block 1704). FIG. 19 is a representative view of hue leaves. In the case of hue leaf, the center of the subdivision can first be determined. The subdivision can be called the center subdivision for the current purpose. The center subdivision belongs to a current row of constant lightness. To ensure continuity of local ICS's and sub-gamuts, neighboring subdivisions can be taken from the previous and next rows of constant lightness. Similar to the case of neutral spine, if the current row of constant lightness is the first or the last row, then adjustment can be made to the above description as there will be no previous or next row. Now, from each of the previous, current and next row of constant lightness, a subdivision can be determined that contains the mid-point chroma of the center subdivision. The neighboring subdivisions in that row of constant lightness are taken to be the determined subdivision and its previous and next subdivision along the row of constant lightness. Of course, adjustment can again be made to the above description if the determined subdivision happens to be the first or the last subdivision in that row of constant lightness, as illustrated in FIG. 19. Further, for each subdivision, there can be a maximum of 9 neighboring subdivisions, including itself.

Referring back to FIG. 17, a local ICS for the subdivision can then be constructed from samples in neighboring subdivisions, based on a particular ICS algorithm (block 1708). In other words, construction of the local ICS for the subdivision can be concluded by applying the chosen (e.g., global) ICS algorithm to the subset of samples that belong to the neighboring subdivisions. In this regard, it is preferred that a (e.g., global) ICS algorithm be used. For example, the $I_n$ algorithm described above can be used. Following block 1708, the process ends (end block 1710).

Figure 20:
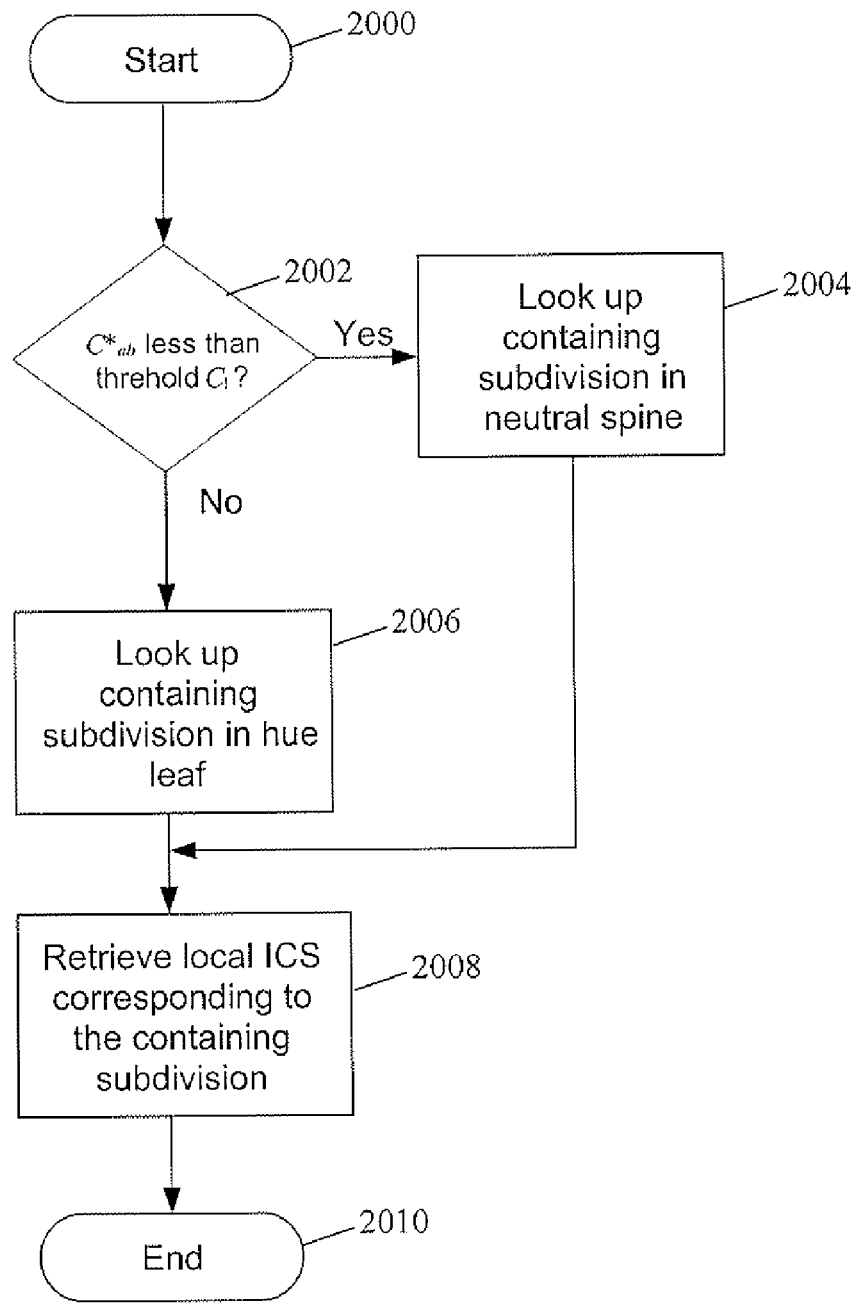
FIG. 20 is a flow diagram illustrating the retrieval of a local ICS based on an input LCh value according to an example embodiment.

FIG. 20 is a flow diagram illustrating the retrieval of a local ICS based on an input LCh value according to an example embodiment. In this regard, the set of local ICS's is itself an ICS algorithm. In other words, a transformation P that converts spectral reflectance to local ICS coordinates, and a transformation Q that converts local ICS coordinates to spectral reflectance need to be specified. To define the transformation P, a spectral reflectance can first be converted to XYZ under the reference illuminant (e.g. $D_{50}$), and can then be converted from XYZ to LCh using the media white point.

Following start block 2000 of FIG. 20, the input LCh value (e.g., $C_{ab}$), which was converted from the input spectral reflectance, can be checked against the condition whether the chroma is less than a threshold value $C_1$ (decision diamond 2002). The $C_1$ value is typically related to the value $C_0$ used in the definition of the neutral spine, but these values do not need to be the same. In fact, the choice of $C_0$ is generally larger to ensure some overlapping with the hue leaves, since the neutral spine and the hue leaves generally cover the whole colorimetric gamut. Further, some overlapping will help ensure smooth transitioning of the point distribution between the hue leaves, and also between the neutral spine and the hue leaves. The choice of $C_1$ can be determined by how small the chroma would introduce enough noise into the hue angle so as to make it undesirable to use the hue angle as a classifier. Generally, $C_1 < C_0$. For example, if $C_0 = 3$, then $C_1 = 2$ may be used.

Figure 21:
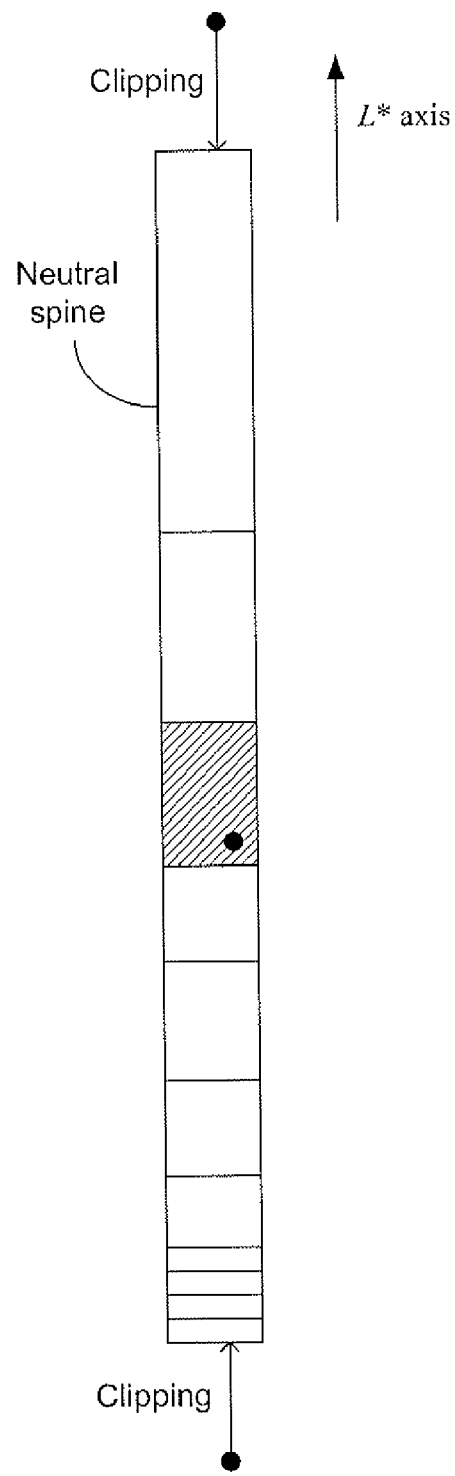
FIG. 21 is a representative view of a neutral spine as it relates to the retrieval of a local ICS according to an example embodiment.

As shown in FIG. 20, if the chroma is less than $C_1$, then a subdivision will be determined from the neutral spine (block 2004). FIG. 21 is a representative view of a neutral spine. In the case of neutral spine, as a preliminary measure, a clipping can be performed to make sure that the lightness of the input LCh value is within the range between minimum and maximum lightness of the neutral spine. This is typically necessary if the input LCh value is outside the colorimetric gamut. Then, the subdivision containing the input LCh value can be determined. In FIG. 21, the shaded region indicates the containing subdivision.

Figure 22:
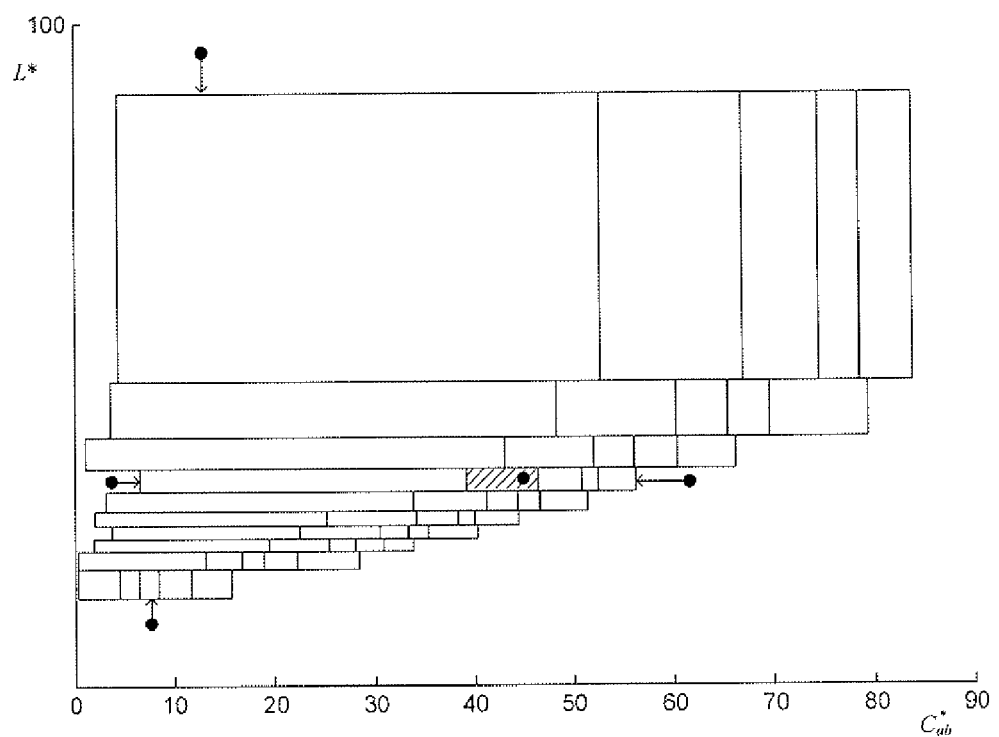
FIG. 22 is a representative view of hue leaves as they relate to the retrieval of a local ICS according to an example embodiment.

Referring back to FIG. 20, if the chroma is not less than $C_1$, then a subdivision will be determined from the hue leaf corresponding to the hue angle (block 2006). FIG. 22 is a representative view of hue leaves. In the case of hue leaf, as a preliminary measure, a clipping can be performed to make sure the input LCh value lies within the hue leaf. More specifically, a clipping is performed if necessary to make sure that the lightness of the input LCh value is within the range between the minimum and maximum lightness of the hue leaf. A clipping is then performed if necessary to make sure the chroma of the input LCh value is within the range between the minimum and maximum chroma of the hue leaf in the corresponding lightness range. The nearest integer hue corresponding to the input hue can then be determined. The hue leaf corresponding to the integer hue can then be retrieved from the constrained subdivision. Then, the subdivision containing the input LCh value can be determined. In FIG. 22, the shaded region indicates the containing subdivision.

Referring back to FIG. 20, the local ICS corresponding to the containing subdivision can then be retrieved (block 2008), and the process ends (end block 2010). More particularly, when the containing subdivision is determined, the local ICS corresponding to the containing subdivision can be retrieved, and the P transformation can be taken to be the P transformation of the local ICS. To define the transformation Q, the local ICS coordinates should come with the identification of the local ICS they correspond to. The Q transformation can then simply be taken to be the Q transformation of the local ICS.

Figure 23:
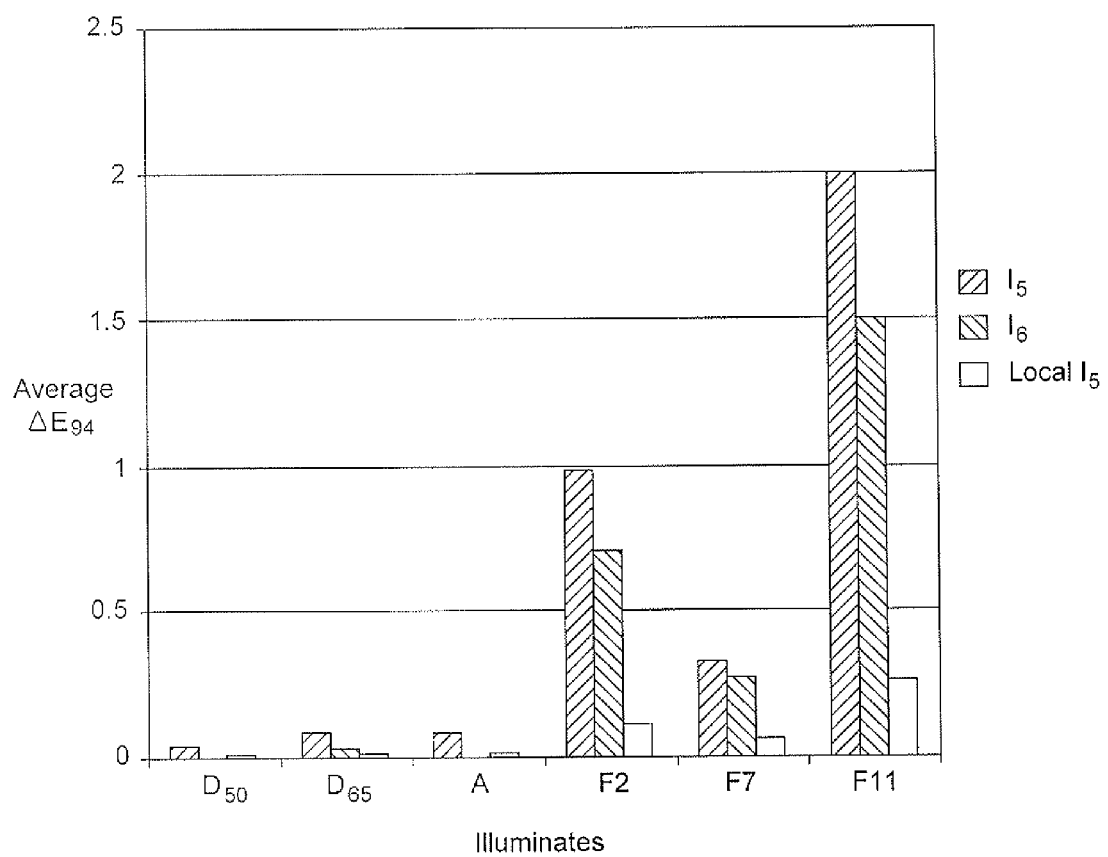
FIG. 23 is a bar graph illustrating example values of round-trip delta-E errors for local ICS's applied to sample data sets.

FIG. 23 is a bar graph illustrating example values of round-trip delta-E errors for local ICS's applied to sample data sets. More particularly, FIG. 23 shows the average round-trip delta-E errors for the ICS's applied to the sample set S. As can be seen in FIG. 23, the localized version typically outperforms the global versions. Also, local $I_5$, though at a lower dimension, can outperform $I_6$. It should be noted that the errors for illuminants $D_{50}$ and A are typically especially small, due to the construction of $I_5$ and $I_6$ that are intended to be optimized for these two illuminants.

Referring back to FIG. 6, block 612 for constructing sub-gamut in local ICS will now be described in detail. Once the local ICS for a subdivision is calculated, the sub-gamut associated with this subdivision can also be determined. In more detail, the same samples used in the construction of the local ICS can be subjected to the local ICS transformation, more specifically the local P transformation. The transformation can convert the samples to local ICS coordinates. A chosen hulling algorithm can then be applied to construct a gamut in the local ICS. Such hulling algorithm can for instance be the convex hull algorithm.

Figure 24:
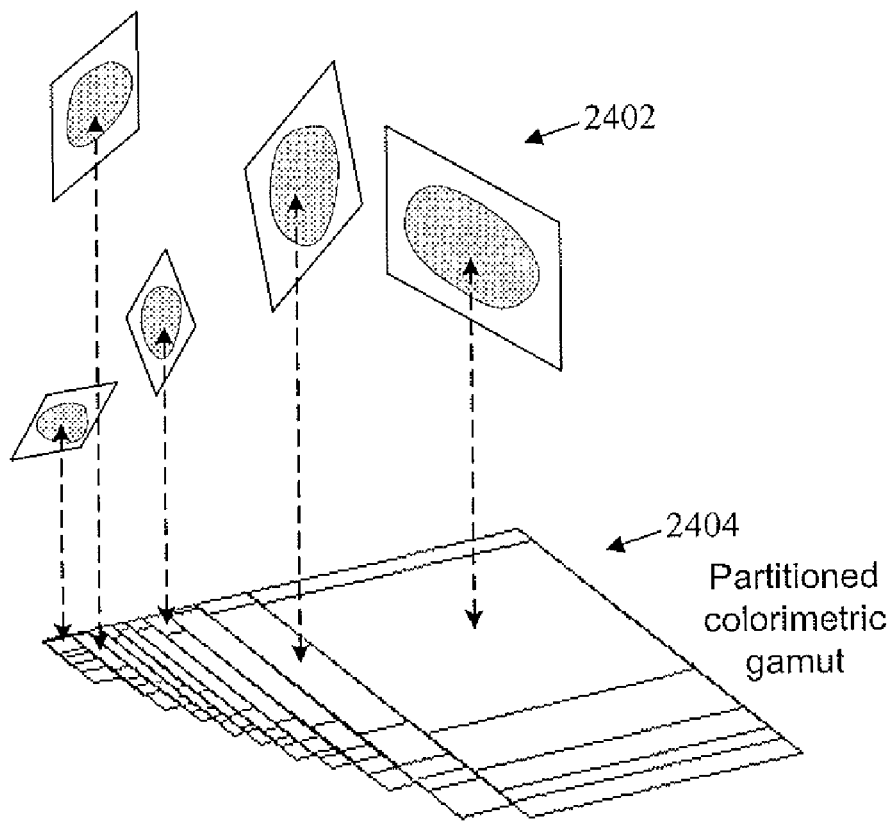
FIG. 24 is a representative view of constructing a sub-gamut within each local ICS according to an example embodiment.

FIG. 24 illustrates the local ICS's 2402 and sub-gamuts 2404. The different orientations of ICS's 2402 indicate that each subdivision can be associated with a different low-dimensional subspace of the space of spectral reflectance. Within each subspace (e.g., local ICS), a sub-gamut 2404 can also be constructed.

A representation of the spectral gamut can be used for checking whether a spectral reflectance is inside the spectral gamut or not, and if not, can be used in further gamut mapping. The computational complexity of these operations can be measured by the number of vertices and facets of the gamut representation. Table 1 shows some example statistics which are typical of the complexity of the gamut hull constructed in $I_5$, $I_6$ and local $I_5$:

TABLE 1

|  | Number of vertices | Number of facets |
| --- | --- | --- |
| $I_5$ | At least 4586 | At least 176520 |
| $I_6$ | At least 9505 | At least 2193014 |
| Local $I_5$ | Average 289 | Average 5821 |

The statistics for convex hull in $I_5$ and $I_6$ are typically lower bounds only. The reason is because computation using the sample set S (which typically consists of 1,285,896 samples) appeared to require an extraordinary amount of memory and computing resources. The above statistics for $I_5$ and $I_6$ were obtained using a reduced sample set obtained by using 18 steps instead of 52 steps per channel. This resulted in a sample set of 46,671 samples. The actual number of vertices and facets, if the set S was used instead, is likely to be larger than the above estimates. For local $I_5$, the number of vertices and facets are averaged over 26670 subdivisions. In this example, the worst case has 637 vertices and 16212 facets. Thus, the use of local ICS is seen to greatly reduce the complexity of the gamut boundary representation.

Figure 25:
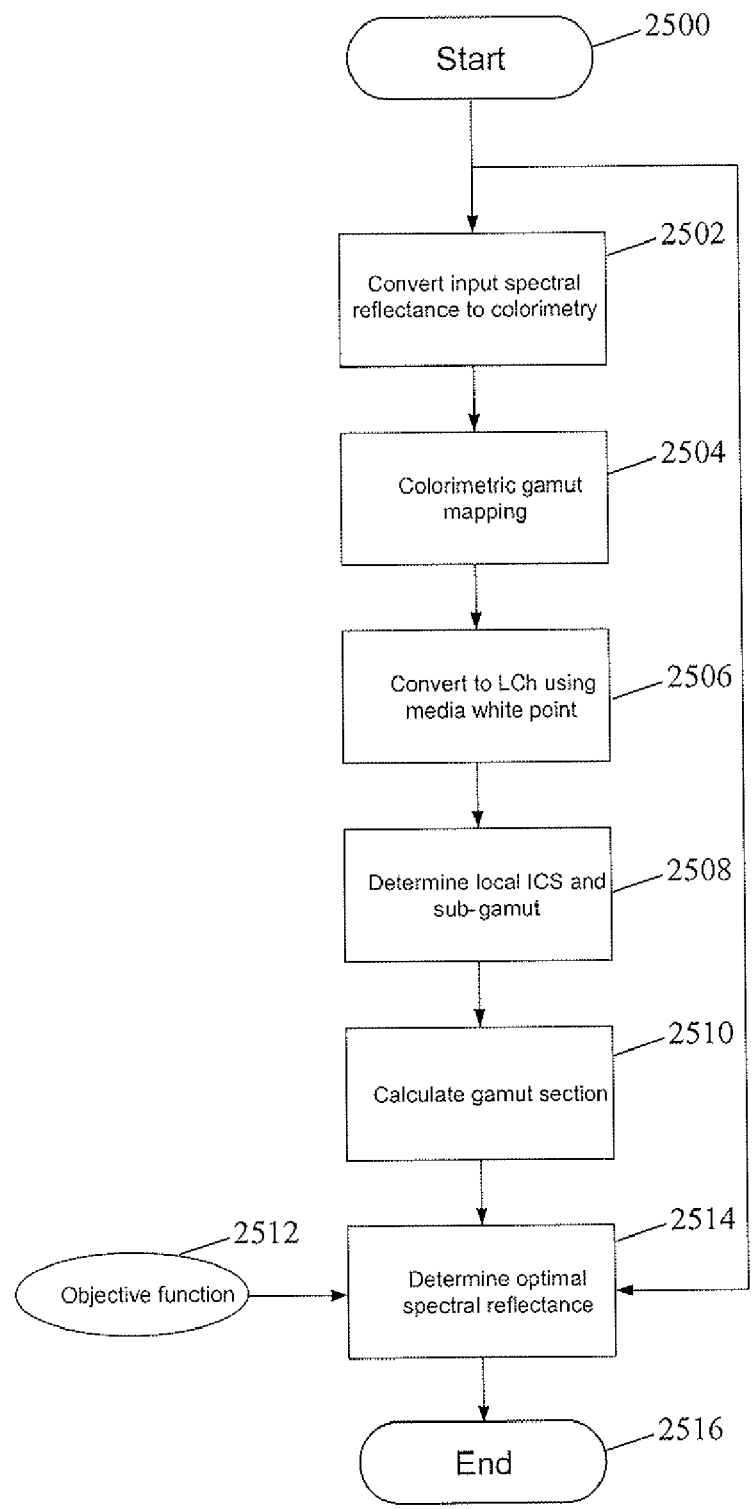
FIG. 25 is a flow diagram which illustrates performing spectral gamut mapping using local ICS's and sub-gamuts according to an example embodiment.

FIG. 25 is a flow diagram which illustrates performing spectral gamut mapping using local ICS's and sub-gamuts according to an example embodiment. In this regard, gamut representation, such as the sub-gamuts constructed as described above, is typically used for gamut checking and for gamut mapping. Following start bubble 2500, an input spectral reflectance is converted to a tristimulus (e.g., colorimetric) value under a reference illuminant such as $D_{50}$ (block 2502). A colorimetric gamut mapping is then applied (block 2504). For example, a minimum color difference mapping, which maps the input tristimulus value to a value in the colorimetric gamut that has a smallest delta-E, can be used for the colorimetric gamut mapping.

The output of the colorimetric gamut mapping can be converted to LCh using the media white point (block 2506) if it is not already in LCh relative to the media white point. The LCh value can be used to determine the containing subdivision as illustrated in FIG. 21 and FIG. 22. It should be noted that some clipping may occur, even though the LCh value should be inside the colorimetric gamut by this point. The local ICS and sub-gamut associated with the containing subdivision can then be determined (block 2508).

In the next step, the gamut section, which is the set of spectral reflectance data inside the sub-gamut that has the same colorimetry as the LCh value, can be calculated (block 2510). The calculation of the gamut section is typically computationally intensive, so the fact that the sub-gamut constructed above has reduced complexity compared to the whole spectral gamut can significantly facilitate in this calculation. With the gamut section determined, an optimal spectral reflectance can be determined from the spectral reflectances in the gamut section (block 2514) based on an objective function 2512, Obj(r,s), where r is the input spectral reflectance, and s is a spectral reflectance in the gamut section. Various choices for the objective function are possible. For example, the Euclidean distance in the space of spectral reflectance can be used, and this function is proportional to the spectral RMS error. Alternatively, another choice can be:

$$\text{Obj}(r,s) = \max_{I \in \{D50, D65, A, F2, F7, F11\}} \Delta E(r,s,I) \quad \text{(Equation 25)}$$

where the notation $\Delta E(r,s,I)$ denotes the delta-E (e.g. $\Delta E_{94}$) of the spectral reflectances r and s, under illuminant I. This objective function typically has the benefit that visual errors (delta-E's) are used, and the illuminants can cover a balanced set of illuminants from daylight, incandescent to fluorescent. Accordingly, the result of FIG. 25 corresponds to a gamut-mapped spectral reflectance. The process then ends (end block 2516).

Figure 26:
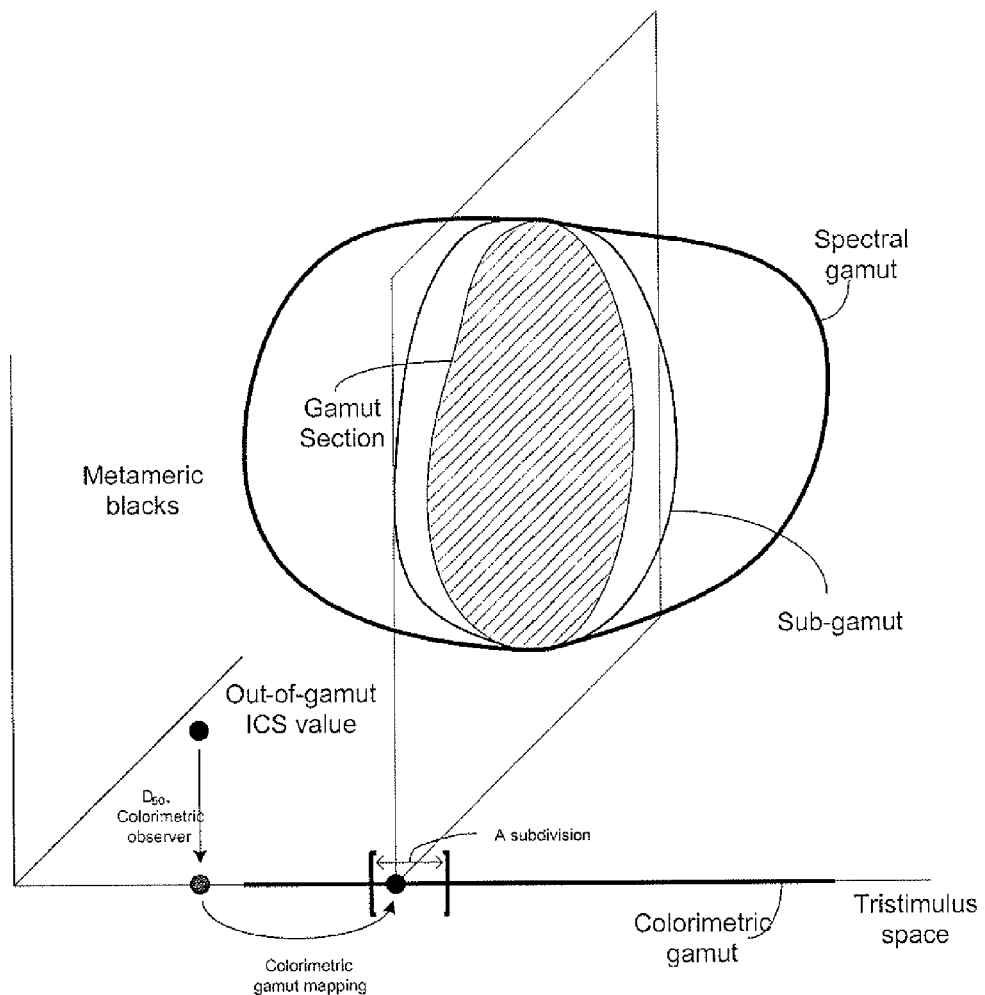
FIG. 26 is a representative view of determining a gamut section according to an example embodiment.

FIG. 26 is a representative view of determining a gamut section according to an example embodiment. More particularly, FIG. 26 corresponds with block 2510 of FIG. 25 and illustrates a sub-gamut intersected with an affine subspace to determine a gamut section.

As shown in FIG. 26, an affine subspace is first constructed. The affine subspace contains points in the ICS that have the same colorimetry as the colorimetrically-gamut-mapped color value. It is also parallel to the linear subspace of metameric blacks. The gamut section is constructed as the intersection of the affine subspace and the identified sub-gamut.

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A method for performing spectral gamut mapping for reproducing an image comprising a plurality of pixels using a device, the method comprising the steps of:
    generating sample data to span a spectral gamut of the device;
    dividing the sample data into plural subdivisions based on colorimetry of the sample data;
    constructing a local interim connection space (ICS) for each of the plural subdivisions;
    constructing a sub-gamut corresponding to each of the local ICS's; and
    for each of the plurality of pixels, selecting a sub-gamut, from the constructed sub-gamuts, which corresponds to the pixel, and
    performing spectral gamut mapping for the pixel using the selected sub-gamut in the local ICS.

2. A method according to claim 1, wherein the generating step, dividing step, constructing the local ICS step and constructing the sub-gamut step are performed during an offline phase, after device characterization data is collected for the device.

3. A method according to claim 1, wherein the selecting step and performing step are performed during an online phase, when the image has been received.

4. A method according to claim 1, wherein the generated sample data corresponds with a stratified sampling of a device space of the device, and the stratified sampling is associated with sampling of the device space at different sampling rates, depending on a dimension of the stratum.

5. A method according to claim 1, wherein the generating the sample data comprises:
    generating sample device values for the device; and
    determining spectral reflectance arrays corresponding to the sample device values using a forward device model for the device.

6. A method according to claim 1, wherein the sample data comprises a set of samples, with each sample within the set corresponding to at least one of the plural subdivisions.

7. A method according to claim 1, wherein the dividing the sample data comprises:
    converting the sample data to XYZ values under a reference illuminant;
    converting the XYZ values to LCh values based on a media white point of the device; and
    dividing the sample data into plural subdivisions based on the LCh values.

8. A method according to claim 1, wherein the dividing the sample data into plural subdivisions is based on a neutral spine and a collection of hue leaves for the sample data.

9. A method according to claim 8, wherein the constructing the local ICS comprises, for each of the plural subdivisions:
    determining whether the subdivision is part of the neutral spine;

determining neighboring subdivisions in the neutral spine, in a case where it is determined that the subdivision is part of the neutral spine;

determining neighboring subdivisions in a hue leaf, in a case where it is determined that the subdivision is not part of the neutral spine; and constructing the local ICS for the subdivision based on samples in the determined neighboring subdivisions.

10. A method according to claim 1, wherein the selecting the sub-gamut, from the constructed sub-gamuts, which corresponds to the pixel comprises:

converting a spectral reflectance which corresponds to the pixel to a colorimetric value;

performing colorimetric gamut mapping on the colorimetric value;

converting the colorimetric gamut-mapped value to an LCh value based on a media white point of the device; and selecting the sub-gamut based on the LCh value.

11. A color management module stored on a computer-readable memory medium which when executed by a processor causes the processor to perform spectral gamut mapping for reproducing an image comprising a plurality of pixels using a device, the color management module comprising:

a generating module constructed to generate sample data to span a spectral gamut of the device;

a dividing module constructed to divide the sample data into plural subdivisions based on colorimetry of the sample data;

a first constructing module constructed to construct a local interim connection space (ICS) for each of the plural subdivisions;

a second constructing module constructed to construct a sub-gamut corresponding to each of the local ICS's;

a selecting module constructed to select, for each of the plurality of pixels, a sub-gamut, from the constructed sub-gamuts, which corresponds to the pixel; and a spectral gamut mapping module constructed to perform, for each of the plurality of pixels, spectral gamut mapping for the pixel using the selected sub-gamut in the local ICS.

12. A color management module according to claim 11, wherein the generating module, dividing module, first constructing module and second constructing module are associated with an offline phase, after device characterization data is collected for the device.

13. A color management module according to claim 11, wherein the selecting module and spectral gamut mapping module are associated with an online phase, when the image has been received.

14. A color management module according to claim 11, wherein the generated sample data corresponds with a stratified sampling of a device space of the device, and the stratified sampling is associated with sampling of the device space at different sampling rates, depending on a dimension of the stratum.

15. A color management module according to claim 11, wherein the generating module is further constructed to:

generate sample device values for the device; and determine spectral reflectance arrays corresponding to the sample device values using a forward device model for the device.

16. A color management module according to claim 11, wherein the sample data comprises a set of samples, with each sample within the set corresponding to at least one of the plural subdivisions.

17. A color management module according to claim 11, wherein the dividing module is further constructed to:

convert the sample data to XYZ values under a reference illuminant;

convert the XYZ values to LCh values based on a media white point of the device; and divide the sample data into plural subdivisions based on the LCh values.

18. A color management module according to claim 11, wherein the dividing module is constructed to divide the sample data into plural subdivisions based on a neutral spine and a collection of hue leaves for the sample data.

19. A color management apparatus comprising:

a computer-readable memory constructed to store computer-executable process steps; and a processor constructed to execute the computer-executable process steps stored in the memory;

wherein the process steps stored in the memory cause the processor to perform spectral gamut mapping for reproducing an image comprising a plurality of pixels using a device, and include computer-executable process steps to:

generate sample data to span a spectral gamut of the device;

divide the sample data into plural subdivisions based on colorimetry of the sample data;

construct a local interim connection space (ICS) for each of the plural subdivisions;

construct a sub-gamut corresponding to each of the local ICS's; and for each of the plurality of pixels, select a sub-gamut, from the constructed sub-gamuts, which corresponds to the pixel, and perform spectral gamut mapping for the pixel using the selected sub-gamut in the local ICS.

20. A non-transitory computer-readable memory medium on which is stored computer-executable process steps for causing a computer to perform spectral gamut mapping for reproducing an image comprising a plurality of pixels using a device, the process steps comprising:

generating sample data to span a spectral gamut of the device;

dividing the sample data into plural subdivisions based on colorimetry of the sample data;

constructing a local interim connection space (ICS) for each of the plural subdivisions;

constructing a sub-gamut corresponding to each of the local ICS's; and for each of the plurality of pixels, selecting a sub-gamut, from the constructed sub-gamuts, which corresponds to the pixel, and performing spectral gamut mapping for the pixel using the selected sub-gamut in the local ICS.

* * * * *